(12) United States Patent
Ito et al.

(10) Patent No.: US 11,353,473 B2
(45) Date of Patent: Jun. 7, 2022

(54) AUTOMATIC ANALYZER AND AUTOMATIC ANALYSIS METHOD

(71) Applicant: Hitachi High-Technologies Corporation, Tokyo (JP)

(72) Inventors: Takumi Ito, Tokyo (JP); Shinji Azuma, Tokyo (JP); Masashi Fukaya, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 435 days.

(21) Appl. No.: 16/466,215

(22) PCT Filed: Nov. 7, 2017

(86) PCT No.: PCT/JP2017/040024
§ 371 (c)(1),
(2) Date: Jun. 3, 2019

(87) PCT Pub. No.: WO2018/110146
PCT Pub. Date: Jun. 21, 2018

(65) Prior Publication Data
US 2020/0064364 A1 Feb. 27, 2020

(30) Foreign Application Priority Data
Dec. 13, 2016 (JP) .............................. JP2016-240844

(51) Int. Cl.
*G01N 35/10* (2006.01)
*G01N 21/78* (2006.01)
*G01N 35/04* (2006.01)

(52) U.S. Cl.
CPC ......... *G01N 35/1004* (2013.01); *G01N 21/78* (2013.01); *G01N 35/04* (2013.01); *G01N 2035/0444* (2013.01)

(58) Field of Classification Search
CPC .... G01N 35/1004; G01N 21/78; G01N 35/04; G01N 2035/0444; G01N 2035/0437
See application file for complete search history.

(56) References Cited

U.S. PATENT DOCUMENTS 5,948,358 A 9/1999 Saito
2008/0101990 A1 5/2008 Liu et al.
(Continued)

FOREIGN PATENT DOCUMENTS

JP 55-157730 U 11/1980
JP 3-172763 A 7/1991
(Continued)

OTHER PUBLICATIONS

International Search Report (PCT/ISA/210) issued in PCT Application No. PCT/JP2017/040024 dated Jan. 30, 2018 with English translation (four (4) pages).
(Continued)

*Primary Examiner* — Jennifer Wecker
*Assistant Examiner* — Oyeleye Alexander Alabi
(74) *Attorney, Agent, or Firm* — Crowell & Moring LLP

(57) ABSTRACT

Provided is a technique related to an automatic analyzer and capable of ensuring cleaning performance of a reaction container by a cleaning process including a tip suction step, and preventing decrease in analysis accuracy or improving the analysis accuracy. The automatic analyzer includes a control apparatus, a block suction mechanism that moves a suction nozzle and a suction block for suctioning a liquid in the reaction container up and down and suctions the liquid, and a block cleaning mechanism for cleaning the suction block. After receiving an analysis request, the control apparatus causes, in a tip suction step that is provided before an analysis step and is a last step of a cleaning step, both suction of the liquid by the block suction mechanism and cleaning
(Continued)

of the suction block by the block cleaning mechanism to be performed in a first step, and then only the suction of the liquid by the block suction mechanism to be performed in a second step including one or more cycles; and causes the analysis step to be performed using the reaction container in which the second step is performed.

9 Claims, 14 Drawing Sheets

(56) References Cited

U.S. PATENT DOCUMENTS

2014/0286824 A1* 9/2014 Yasui .................... G01N 35/04
422/64
2015/0125940 A1 5/2015 Oguro et al.

FOREIGN PATENT DOCUMENTS

| JP | 6-331631 A | 12/1994 |
| JP | 10-62431 A | 3/1998 |
| JP | 11-304816 A | 11/1999 |
| JP | 2000-28623 A | 1/2000 |
| JP | 2008-224538 A | 9/2008 |
| JP | 2015-87345 A | 5/2015 |

OTHER PUBLICATIONS

Japanese-language Written Opinion (PCT/ISA/237) issued in PCT Application No. PCT/JP2017/040024 dated Jan. 30, 2018 (five(5) pages).

* cited by examiner

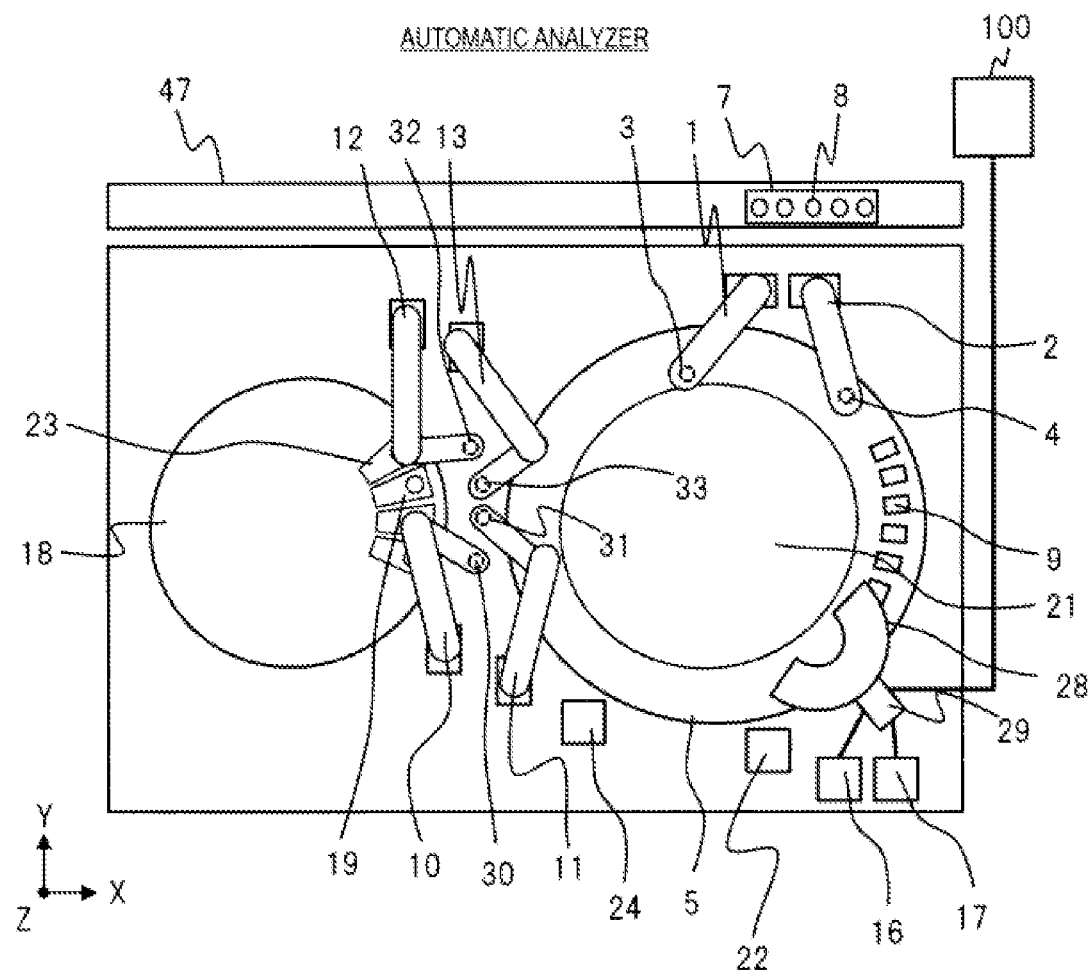

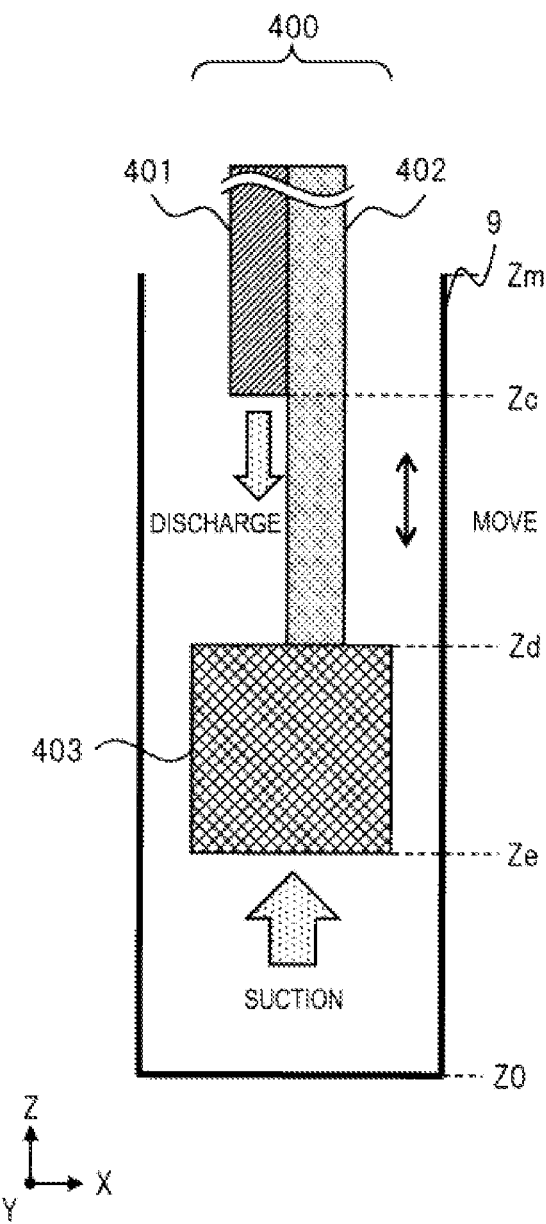
[FIG. 4]

[FIG. 5]
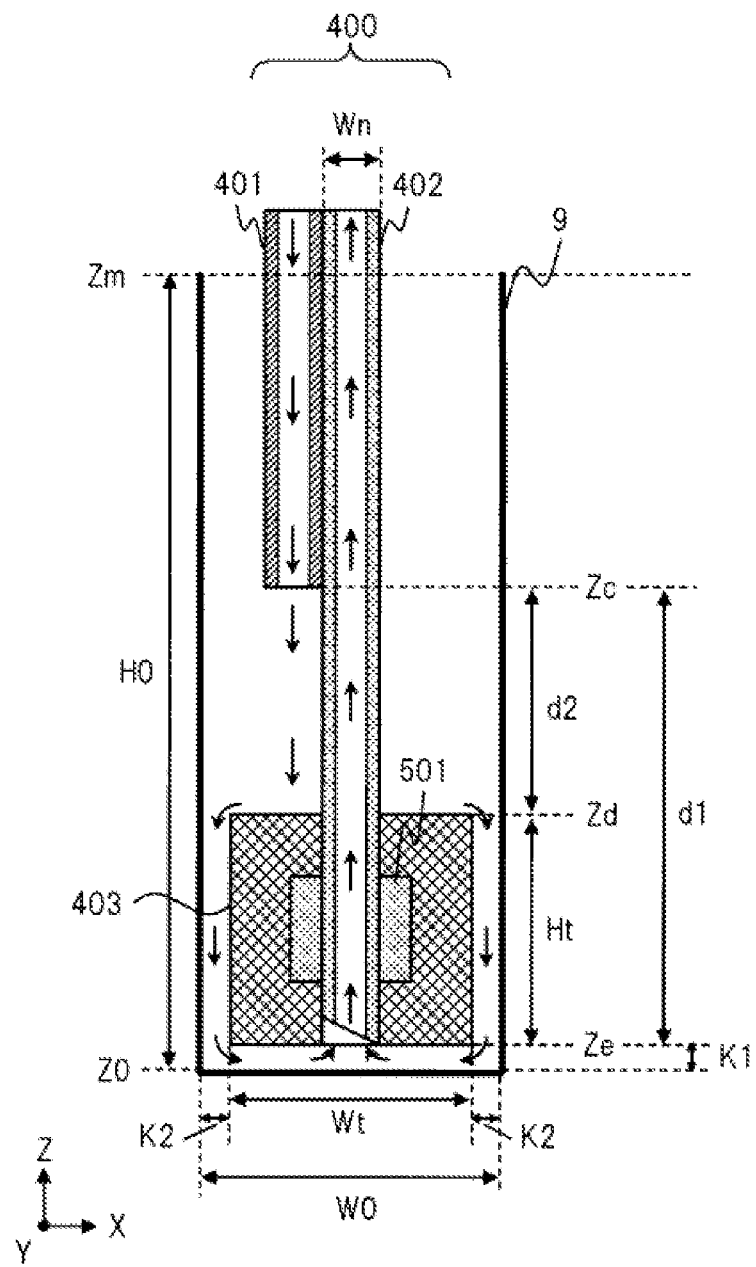

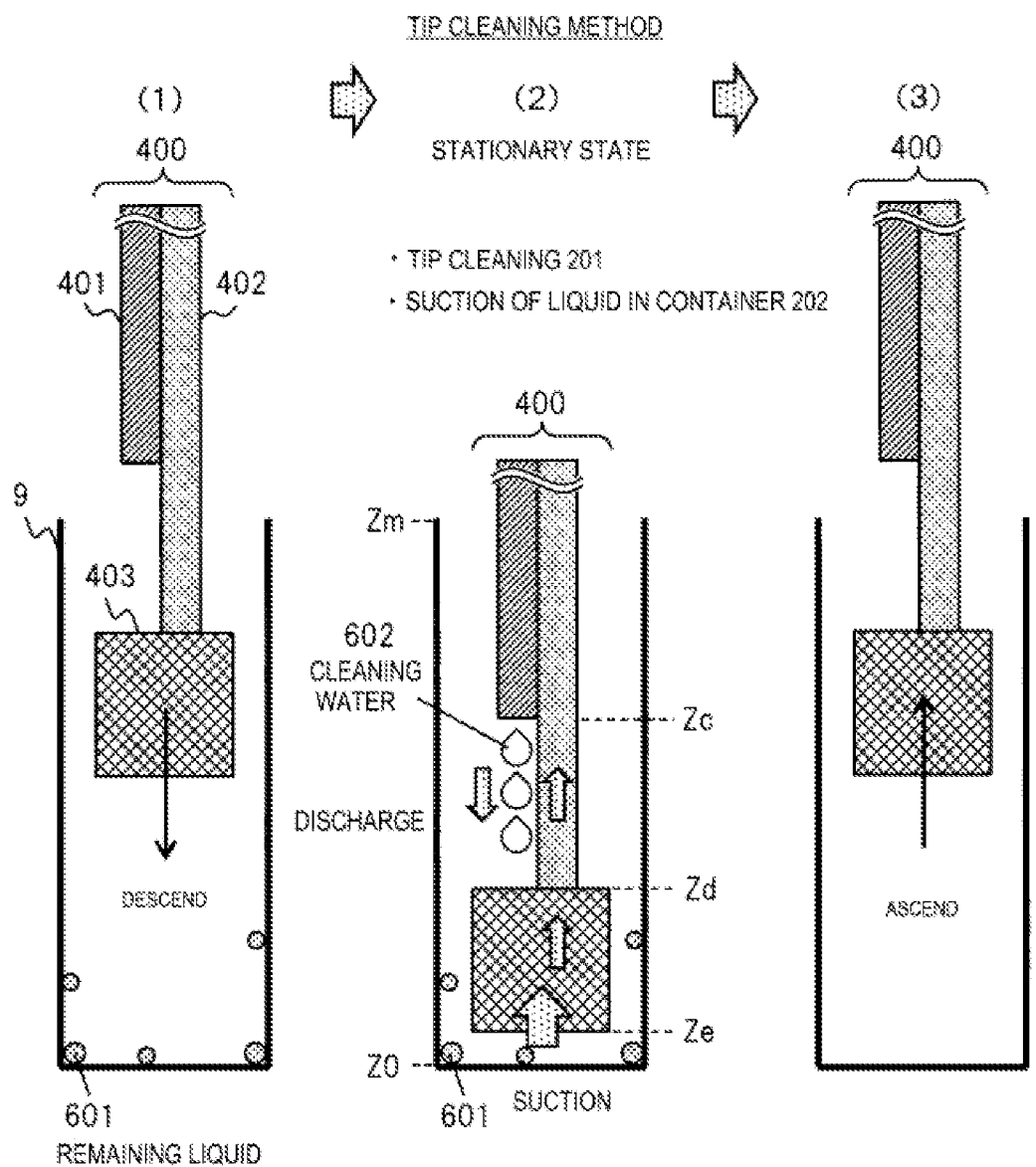

[FIG. 7]
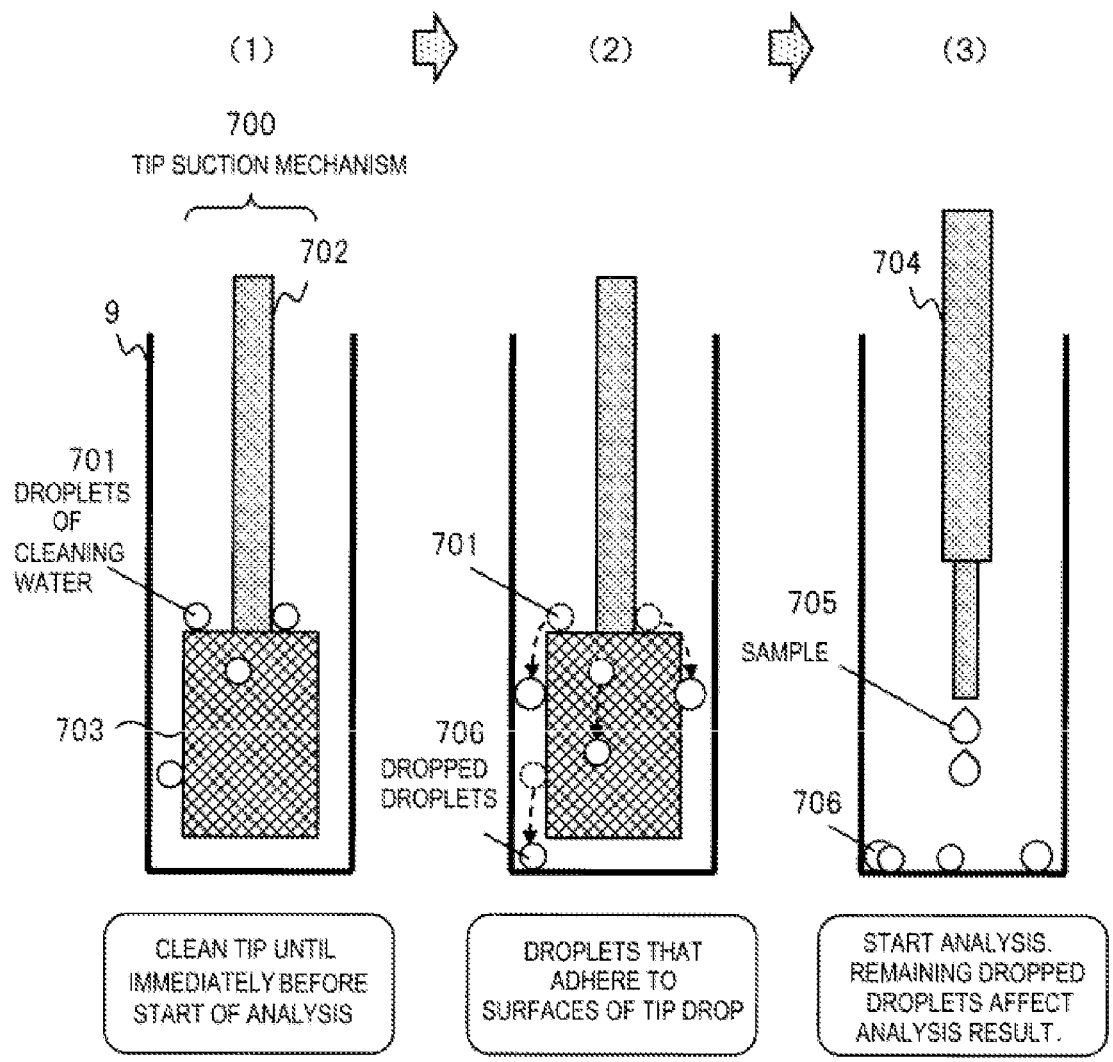

FIG. 8A   SIMULATION IN ACCORDANCE WITH SHAPES
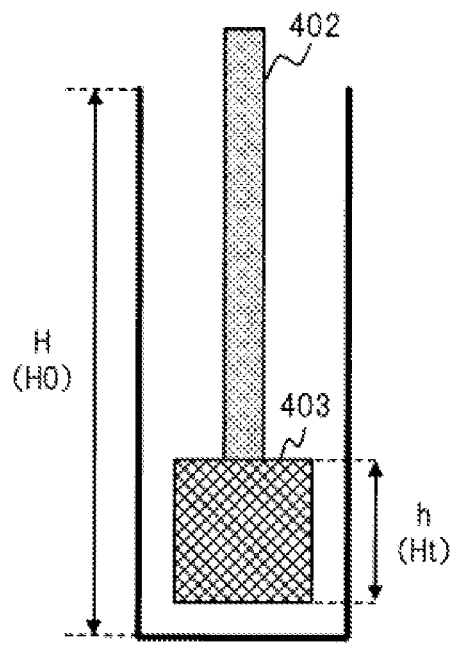
FIG. 8B
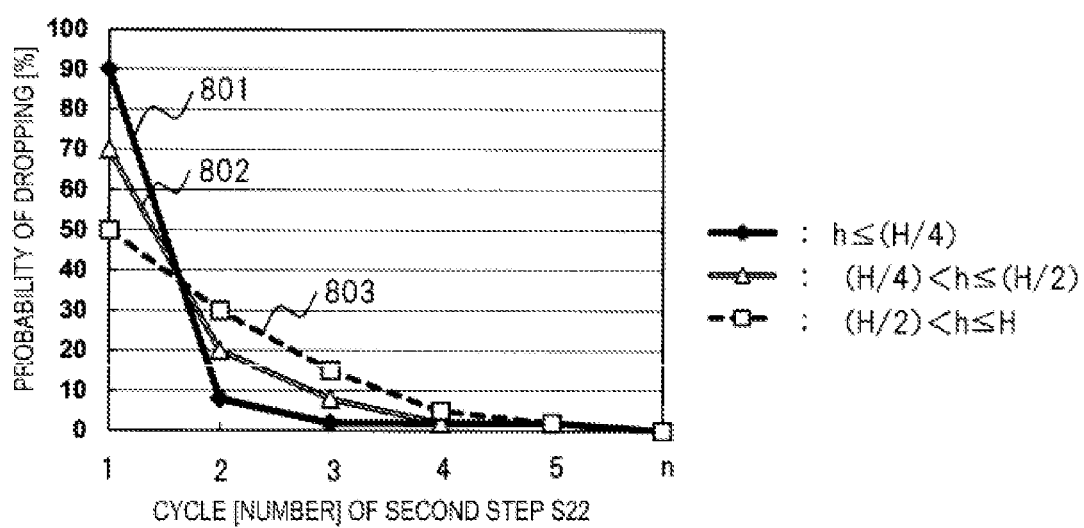

[FIG. 9]
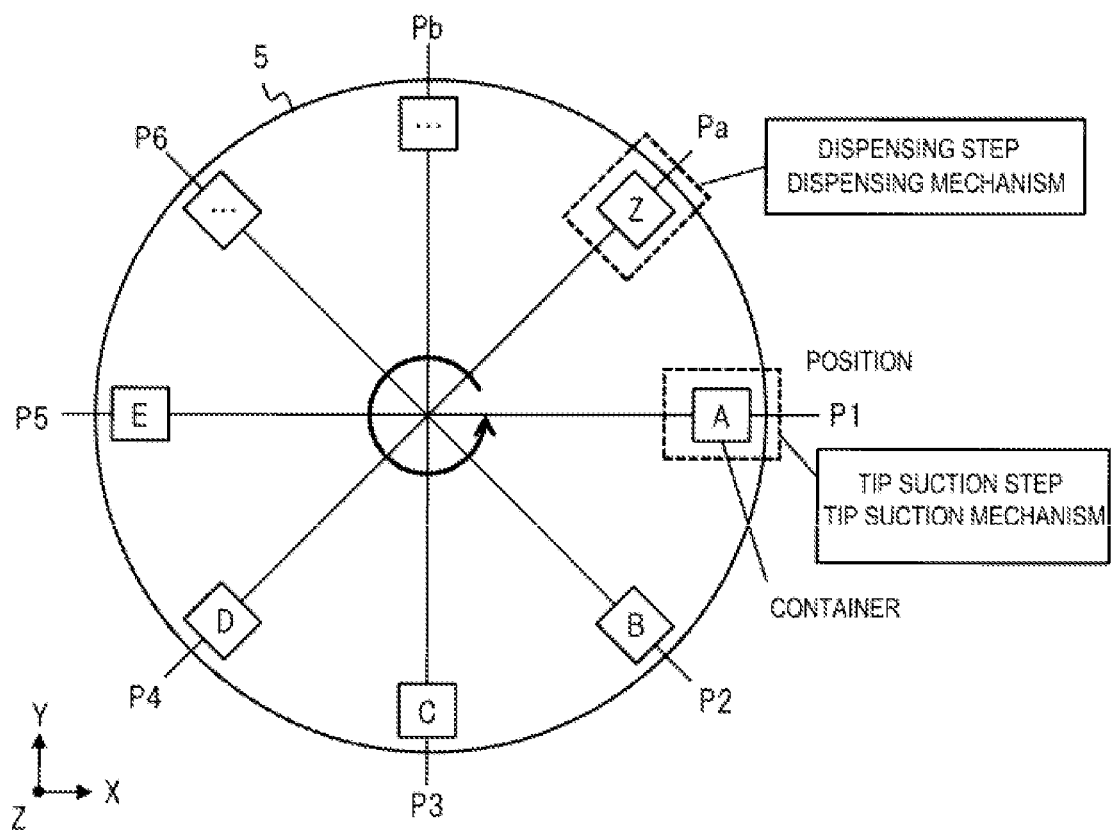

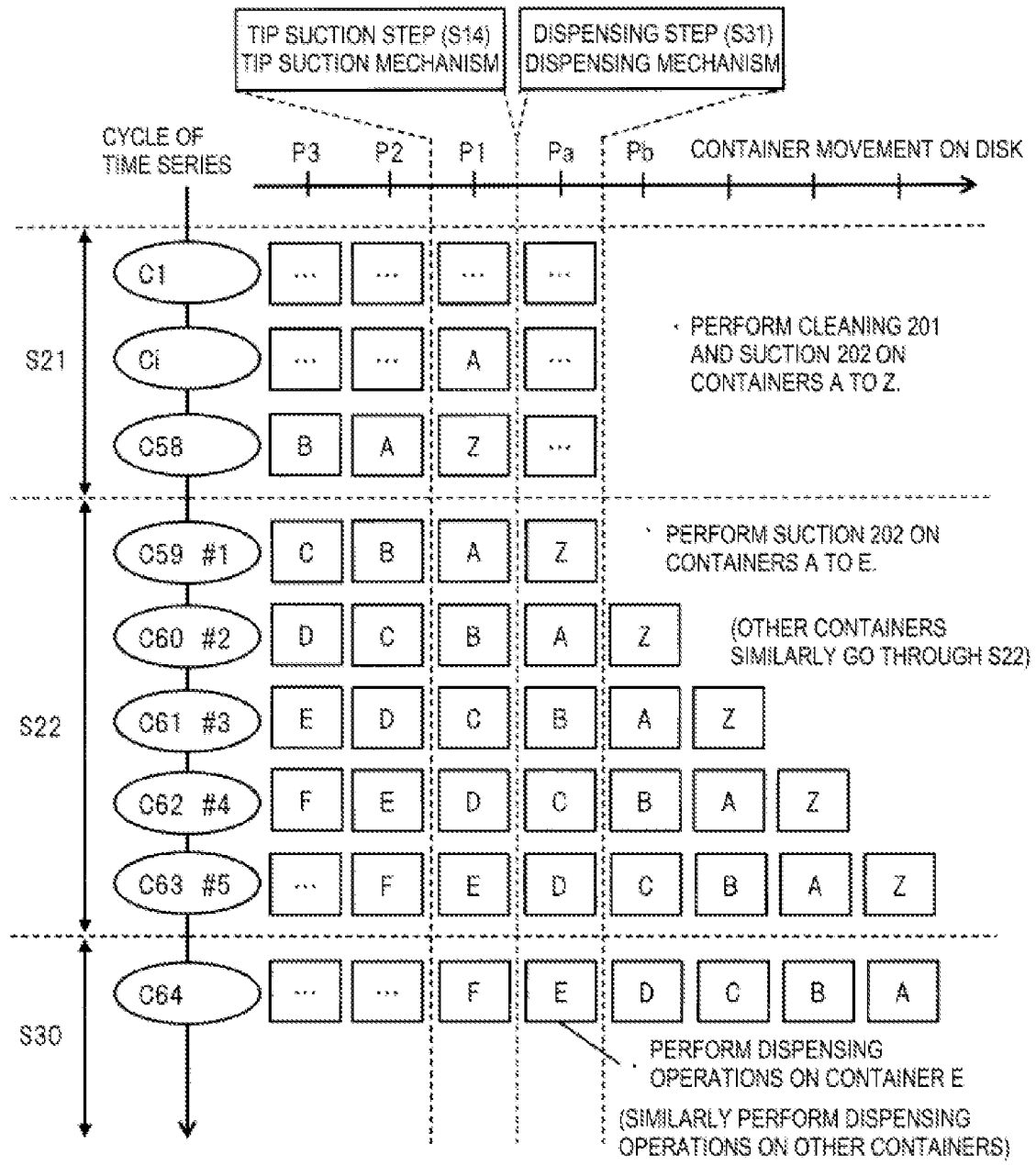

[FIG. 11]
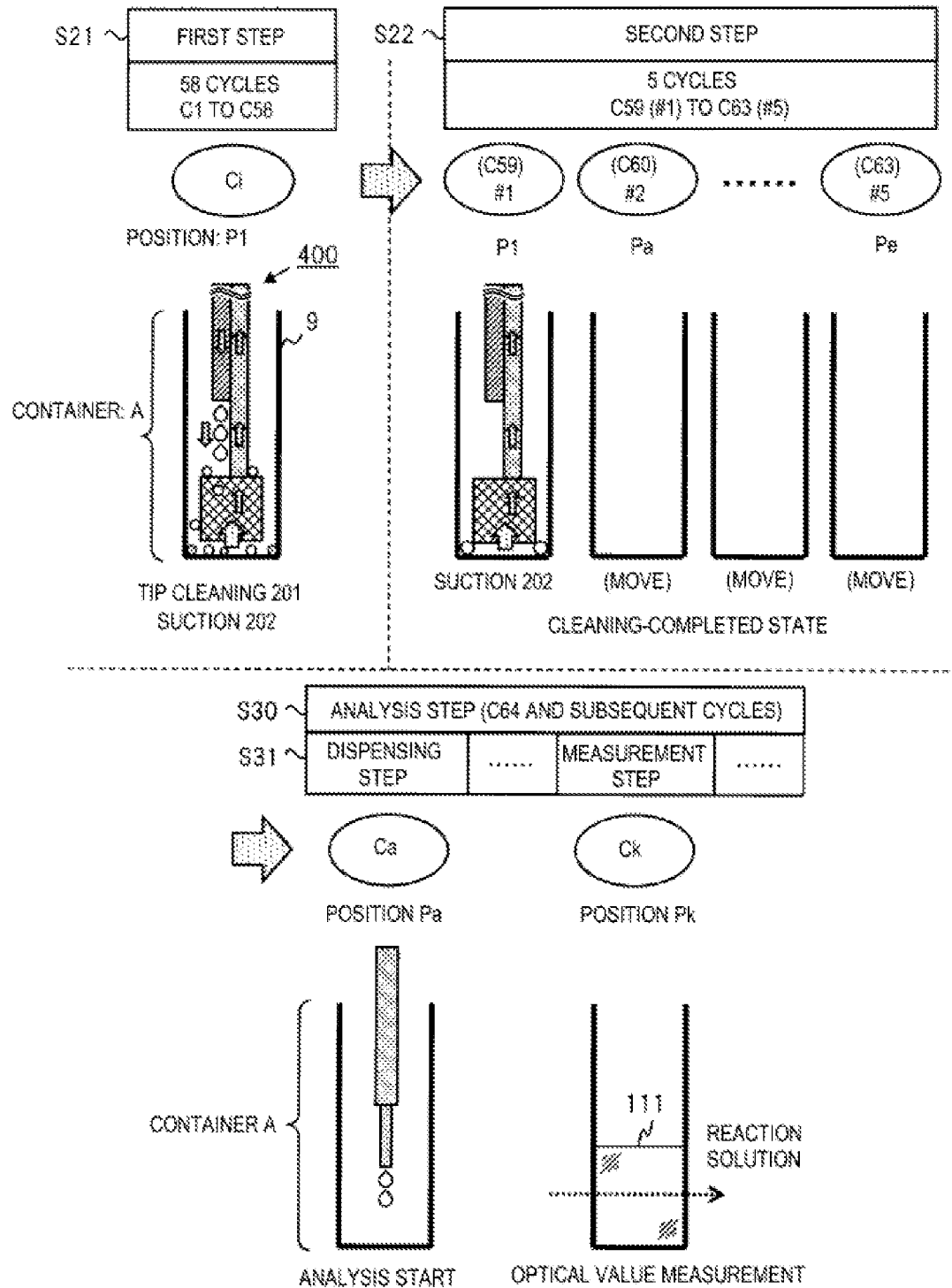

[FIG. 12]
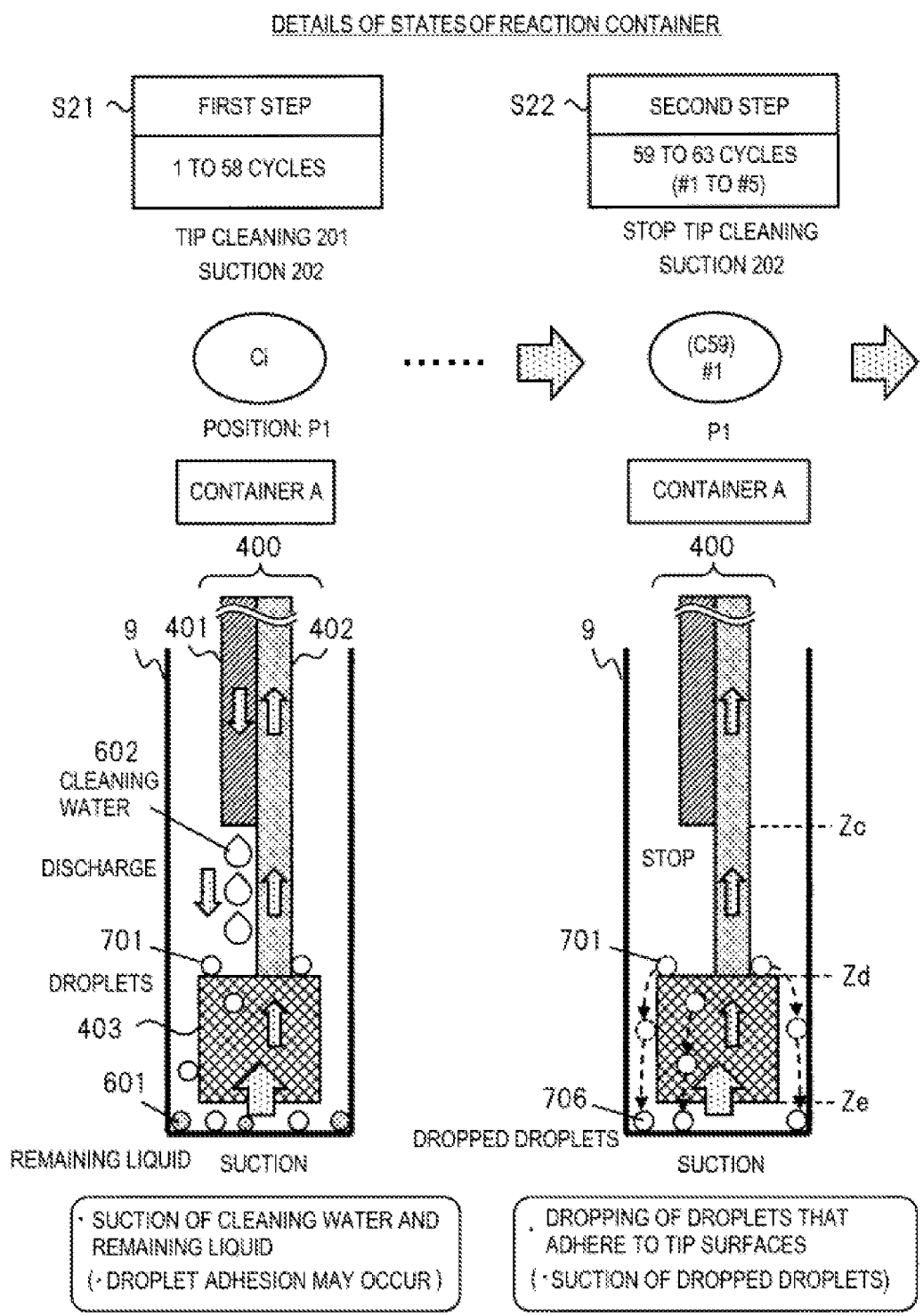

[FIG. 13]
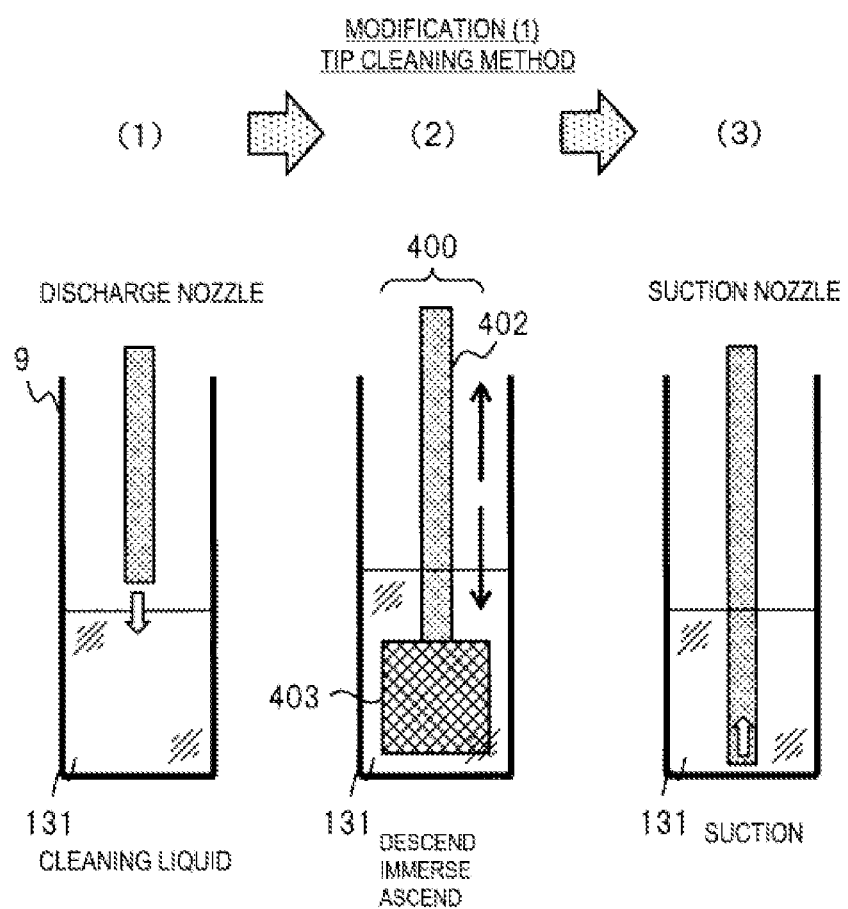

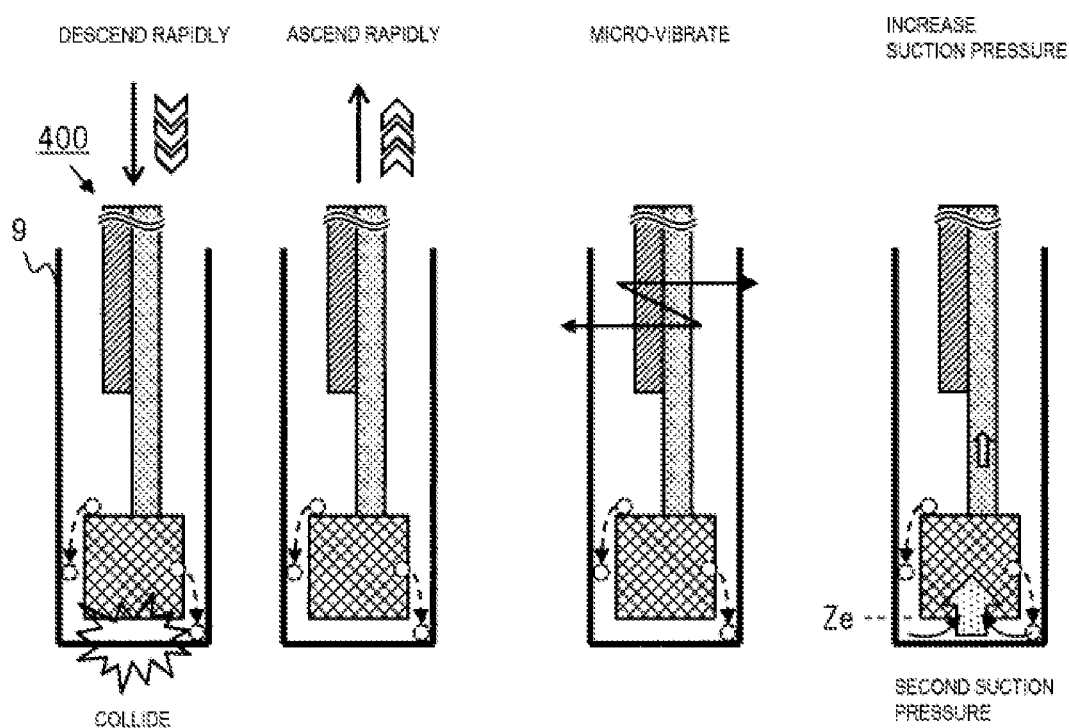

AUTOMATIC ANALYZER AND AUTOMATIC ANALYSIS METHOD

TECHNICAL FIELD

The present invention relates to a technique of an automatic analyzer having a function of optically measuring a concentration or an activity value of a biological sample such as blood or urine. The invention particularly relates to a cleaning technique for a reaction container (hereinafter sometimes referred to as a container) in which a sample or a reagent is stored.

BACKGROUND ART

The automatic analyzer includes an optical measurement mechanism and the like, and a cleaning mechanism that cleans a reaction container. A control apparatus of the automatic analyzer controls a sequence including a cleaning step of the cleaning mechanism. The automatic analyzer uses each nozzle of a dispensing mechanism for a sample and a reagent to dispense the sample and the reagent from each container into the reaction container, and uses a stirring mechanism to stir a mixture of the sample and the reagent to obtain a reaction solution. The automatic analyzer measures a color tone change or the like of the reaction solution in the reaction container with an optical photometer, and quantifies a target substance in the sample from a measured value and outputs a result. The automatic analyzer includes the cleaning mechanism that cleans an inside of the reaction container in order to avoid contamination with a previously measured sample when a used reaction container is reused in measurement.

A biological sample contains components such as a protein or a lipid. Many reagents also contain a protein component such as an enzyme. Therefore, dirt is likely to accumulate in parts such as the reaction container and a nozzle of the cleaning mechanism thereof. Water, an alkali solution, an acidic solution, a neutral detergent, a hypochlorite agent are used as a liquid for cleaning the container.

JP-A-H10-62431 (PTL 1) is exemplified as a related art example regarding a cleaning mechanism of an automatic analyzer. PTL 1 discloses a cleaning apparatus in a biochemical automatic analyzer that simply and reliably removes a water droplet on a side wall of a reaction container and the following. The cleaning apparatus includes a suction portion (block) that is provided at a lower end of a drain tube (nozzle) and capable of entering the reaction container. A flow path is formed between the suction unit and an inner wall surface of the reaction container. The water droplet that adheres to the inner wall surface is suctioned through the flow path at the time of draining from the suction unit by suction.

PRIOR ART LITERATURE

Patent Literature

PTL 1: JP-A-H10-62431

SUMMARY OF INVENTION

Technical Problem

In the automatic analyzer, a dispensing amount of the sample or the reagent varies in accordance with an item to be measured. A contamination range of the reaction container by a reaction solution is not unvarying. Therefore, in the cleaning mechanism, cleaning is performed with respect to a cleaning range corresponding to the contamination range for the reaction container after use by using various kinds of detergents. At the time of cleaning, basically, the reaction container to which the reaction solution is dispensed is subjected to a suction operation in a next cycle. For example, a reaction solution after discharge of an alkaline solution is suctioned in the next cycle, and water is discharged in a further next cycle.

In many cases, cleaning of the reaction container is completed with the suction operation. This is because if cleaning water remains in the container, a concentration of the reaction solution may be diluted. Therefore, a tip suction step is provided before one cycle of the reaction container used for analysis (optical measurement). In the tip suction step, in order to achieve high airtightness in the reaction container and effectively suction the cleaning water, a liquid in the container is suctioned using a suction nozzle including a predetermined suction tip. The suction tip has a shape such as a shape of block (rectangular parallelepiped). The suction tip is formed of a material that does not damage the container, such as silicon or plastic.

The automatic analyzer is required to improve throughput so as to speed up an inspection at a clinical site. Accordingly, ensuring measurement accuracy by reliable cleaning, and completing the cleaning in a shorter time are required for cleaning performance of the reaction container.

In the automatic analyzer of related art, in a case where the tip suction step is performed using a tip suction mechanism, a liquid such as the cleaning water in the tip suction step may remain adhered to the suction tip. At start of the analysis, remaining liquid of the suction tip may drop into the reaction container used for the analysis. In this case, the remaining liquid is mixed with the reaction solution, and thus the optical measurement may be affected and a measured value may deteriorate.

The related art example in PTL 1 discloses that a liquid of the cleaning water is more reliably and effectively removed from an inside of the container through a step which uses the suction nozzle (drainage tube) including the suction tip (suction unit). However, in the related art example, an effect of the tip suction step itself on an analysis result is not discussed, and a method for a cleaning process that does not reduce measurement accuracy or improves the measurement accuracy is also not described.

An object of the invention is to provide an automatic analyzer and a technique capable of ensuring cleaning performance of a reaction container by a cleaning process including a tip suction step, and preventing decrease in analysis accuracy or improving the analysis accuracy.

Solution to Problem

A representative embodiment of the invention is an automatic analyzer having the following configuration.

An aspect of the invention provides an automatic analyzer. The automatic analyzer has a function of performing optical measurement on a reaction solution which contains a sample and a reagent and cleaning of the reaction container, and includes: a control apparatus that controls a sequence which includes the optical measurement and the cleaning; a block suction mechanism that includes a suction nozzle which suctions a liquid in the reaction container and a suction block attached to a lower end in a vertical direction of the suction nozzle, moves the suction nozzle and the suction block up and down in the vertical direction, and suctions the liquid; and a block cleaning mechanism that cleans the suction block, in which after receiving a request for starting the optical measurement, the control apparatus causes, in the step of the cleaning that is provided before a step of the optical measurement, both suction of the liquid by the block suction mechanism and cleaning of the suction block by the block cleaning mechanism to be performed in a first step that includes a plurality of cycles in which a unit movement of the reaction container is set as one cycle, and then only the suction of the liquid by the block suction mechanism to be performed in a second step that includes one or more cycles; and causes the step of the optical measurement to be performed by using the reaction container in which the second step is performed.

Advantageous Effect

According to the exemplary embodiment of the invention, regarding the automatic analyzer, cleaning performance of the reaction container can be ensured by the cleaning process including the tip suction step, and decrease in optical measurement accuracy can be prevented or the optical measurement accuracy can be improved.

BRIEF DESCRIPTION OF DRAWINGS

FIG. 1 illustrates a configuration of an automatic analyzer according to a first embodiment of the invention.

FIG. 4 illustrates a configuration of a nozzle of a tip suction mechanism or the like in the automatic analyzer according to the first embodiment.

FIG. 5 illustrates a cross section of the tip suction mechanism in the automatic analyzer according to the first embodiment.

FIG. 6 illustrates a tip cleaning method in the automatic analyzer according to the first embodiment.

FIG. 7 illustrates problems of a tip suction step in a comparative example with respect to the automatic analyzer according to the first embodiment.

FIGS. 8A and 8B show an experiment and a simulation result regarding a second step in accordance with a specification of shapes of a reaction container and a suction tip in the automatic analyzer according to the first embodiment.

FIG. 9 schematically illustrates a state viewed from the top of a disk regarding the tip suction step in the automatic analyzer according to the first embodiment.

FIG. 10 illustrates a relationship between a cycle and a movement of the reaction container which are related to a sequence including the tip suction step, in the automatic analyzer according to the first embodiment.

FIG. 11 illustrates state transition of the reaction container regarding the tip suction step in the automatic analyzer according to the first embodiment.

FIG. 12 illustrates details of reaction container states regarding a first step and the second step in the automatic analyzer according to the first embodiment.

FIG. 13 illustrates a tip cleaning method in an automatic analyzer according to a first modification of the first embodiment.

FIGS. 14A to 14D illustrate special operations regarding a second step of a tip suction step in an automatic analyzer according to a second modification of the first embodiment.

DESCRIPTION OF EMBODIMENTS

Figure 2A:
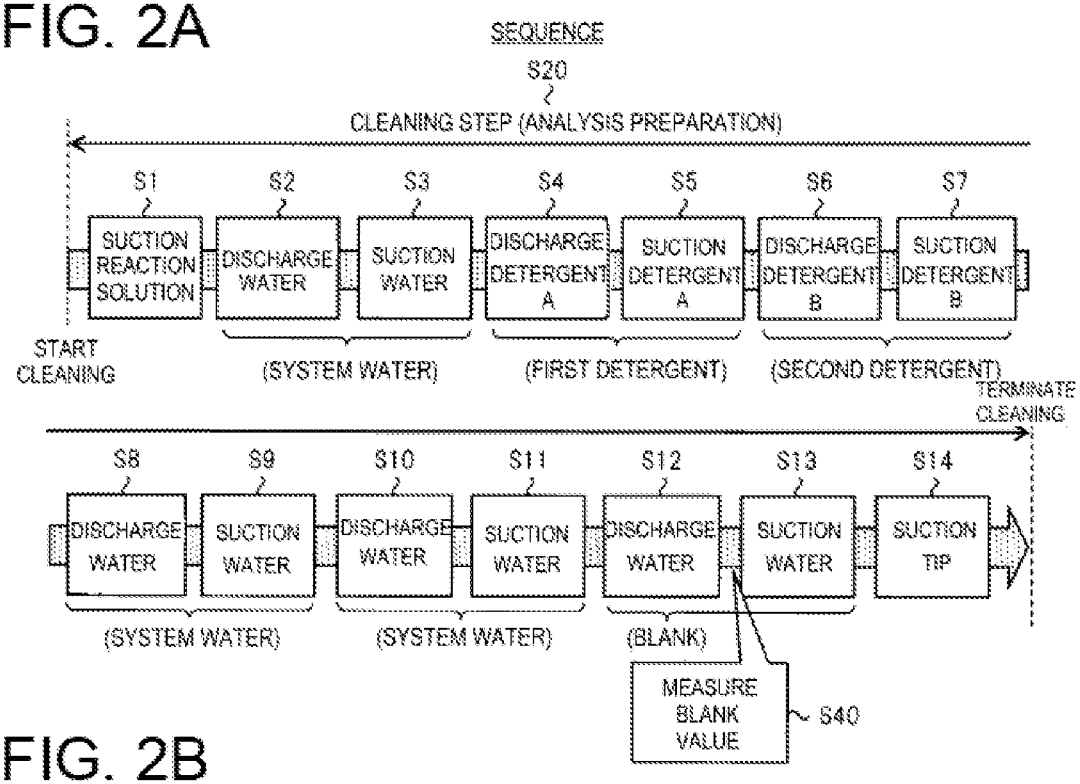
FIGS. 2A and 2B illustrate an outline of a sequence including, a cleaning step in the automatic analyzer according to the first embodiment.

Hereinafter, an embodiment of the invention is described in detail based on drawings. In all the drawings that describe the embodiment, same components are denoted by same reference numerals in principle, and repetitive description thereof is omitted. (X, Y, Z) is used as a direction and a coordinate system for explanation. An X direction, which is a first direction, is a direction in a horizontal direction. A Y direction, which is a second direction, is a direction orthogonal to the X direction in the horizontal direction. A Z direction, which is a third direction, is a vertical direction perpendicular to the X direction and the Y direction.

First Embodiment

An automatic analyzer according to a first embodiment of the invention is described with reference to FIGS. 1 to 14. The automatic analyzer according to the first embodiment has a specific cleaning function. An automatic analysis method according to the first embodiment includes steps performed in the automatic analyzer according to the first embodiment.

[Automatic Analyzer (1)]

FIG. 1 illustrates a configuration of the automatic analyzer according to the first embodiment. The automatic analyzer includes a control apparatus 100, a reaction disk 5, reaction containers 9, a reagent disk 18, and reagent bottles 23, a rack 7, sample containers 8, sample dispensing mechanisms 1, 2, sample dispensing nozzles 3, 4, a sample transport mechanism 47, reagent dispensing mechanisms 10 to 13, reagent dispensing nozzles 30 to 33, a spectrophotometer 22, a stirring mechanism 24, a reaction container cleaning mechanism 29, a liquid delivery pump 16, and a vacuum suction pump 17.

Except for parts related to the control apparatus 100 and the reaction container cleaning mechanism 29 serving as a cleaning mechanism, each portion can be basically configured using a known technique. The control apparatus 100 controls the entire automatic analyzer including the cleaning mechanism, and controls an entire sequence including steps of cleaning and analysis. Only a portion is illustrated between the control apparatus 100 and each portion, but the control apparatus 100 and each portion are connected by wiring. Various signals are transmitted and received between the control apparatus 100 and each portion through the wiring. Accordingly, operations of each step including the cleaning and the analysis are controlled.

A plurality of reaction containers 9 are circumferentially disposed side by side on the reaction disk 5. The reaction disk 5 is rotationally driven. Accordingly, each reaction container 9 is rotationally moved by a unit at a distance per cycle of the sequence on a circumference of the reaction disk 5.

The plurality of reagent bottles 23 can be disposed on a circumference of the reagent disk 18. The sample transport mechanism 47 that moves the rack 7 on which the sample container 8 is placed is disposed behind the automatic analyzer. A sample such as blood or urine is contained in the sample container 8. The sample container 8 is placed on the rack 7 and carried by the sample transport mechanism 47.

The reagent dispensing mechanisms 10, 11, 12 and 13 are disposed between the reaction disk 5 and the reagent disk 18.

These reagent dispensing mechanisms include reagent dispensing nozzles 30, 31, 32, and 33.

The sample dispensing mechanisms 1, 2 are disposed between the reaction disk 5 and the sample transport mechanism 47. The sample dispensing mechanisms 1, 2 can rotate, horizontally move, and vertically move up and down. The sample dispensing mechanisms 1, 2 include the sample dispensing nozzles 3, 4, respectively. In accordance with a drive control, the sample dispensing nozzles 3, 4 rotate around a rotation axis, horizontally move on a horizontal movement rail, and dispense the sample from the sample container 8 to the reaction container 9.

The reaction container cleaning mechanism 29, the spectrophotometer 22, and the stirring mechanism 24 are disposed around the reaction disk 5. The liquid delivery pump 16 that performs cleaning, the vacuum suction pump 17 or the like are connected to the reaction container cleaning mechanism 29. The liquid delivery pump 16 delivers a cleaning liquid through a flow path of a tube or the like to a discharge nozzle related to the cleaning. The vacuum suction pump 17 delivers a liquid through a flow path of a tube or the like by vacuum suction from a suction nozzle related to suction.

A cleaning tank or the like may be disposed as the cleaning mechanism that cleans the sample nozzles 3, 4 and the reagent nozzles 30 to 33 on operation ranges of the sample dispensing mechanisms 1, 2, the reagent dispensing mechanisms 10 to 13, and the stirring mechanism 24. A liquid delivery pump for a reagent may be connected to the reagent dispensing mechanisms 10 to 13.

Then, analysis (optical measurement) operations are described. In a dispensing step, based on the drive control, the sample dispensing mechanisms 1, 2 suction the samples from the sample containers 8 of the rack 7 and discharge the samples to the reaction containers 9 by the sample dispensing nozzles 3, 4. The reagent dispensing mechanisms 10 to 13 suction the reagents from the reagent bottles 23 and discharge the reagents to the reaction containers 9 by the reagent dispensing nozzles 30 to 33. The sample and the reagent dispensed into the same reaction container 9 are stirred and mixed by the stirring mechanism 24 to generate a reaction solution that is a mixed solution.

The spectrophotometer 22 performs the optical measurement on the reaction solution in the reaction container 9, and measures an optical value such as spectrophotometry. The reaction disk 5 performs operations of rotation and stop in one cycle. One cycle time is, for example, 1.8 seconds. Stop time of the reaction container 9 is, for example, 1 second. The optical measurement is periodically performed by the spectrophotometer 22 in every cycle when the reaction container 9 to be subjected to the optical measurement passes in front of the spectrophotometer 22. Accordingly, a concentration or an activity value of a target component in the sample in the reaction container 9 is calculated.

Then, cleaning of the reaction container 9 is described. A plurality of nozzles that serve various functions as described below are disposed in the reaction container cleaning mechanism 29. The plurality of nozzles are commonly connected through a housing of the reaction container cleaning mechanism 29. The plurality of nozzles are connected to tubes, electromagnetic valves, flow rate adjustment units, and pumps through the reaction container cleaning mechanism 29.

Based on the drive control of the control apparatus 100, when the rotation of the reaction disk 5 is stopped and the reaction container 9 is stationary, the nozzle of the reaction container cleaning mechanism 29 moves up and down in the vertical direction with respect to a position of the target reaction container 9. Accordingly, the nozzle gets access to the reaction container 9 by being inserted into the same.

In accordance with a functional configuration of the automatic analyzer, the number of the reaction container cleaning mechanism 29 is not limited to one, and a plurality of the reaction container cleaning mechanisms 29 may be provided in the same manner. In particular, the nozzle of the reaction container cleaning mechanism 29 may be disposed at any position as long as the position corresponds to the reaction container 9 on the circumference of the reaction disk 5.

[Automatic Analyzer (2)]

The automatic analyzer according to the first embodiment has a following configuration. In the automatic analyzer, a mechanism on which the plurality of reaction containers 9 are circumferentially disposed and rotated is included. In order to repeatedly use the reaction container 9, the automatic analyzer includes the reaction container cleaning mechanism 29. The plurality of types of nozzles are disposed in the reaction container cleaning mechanism 29. The nozzles include a discharge nozzle (FIG. 3(A) to be described below) that discharges a liquid such as the cleaning liquid into the reaction container 9, and a suction nozzle (FIG. 3(B) to be described below) that suctions a liquid such as the reaction solution in the reaction container 9. The reaction container cleaning mechanism 29 corresponds to both a function of performing normal cleaning on the reaction container 9 after the analysis and a function of performing cleaning in analysis preparation on the reaction container 9 before start of the analysis.

In particular, the reaction container cleaning mechanism 29 includes a tip suction mechanism for a tip suction step (FIG. 4 to be described below). The tip suction mechanism includes a suction nozzle including a suction tip and a discharge nozzle for cleaning the suction tip itself. The suction tip implements a function of effectively removing a remaining liquid by cleaning or rinsing the reaction container 9.

Each nozzle of the cleaning mechanism is connected to the liquid delivery pump 16 related to discharge operation or the vacuum suction pump 17 related to a suction operation through a tube. The electromagnetic valve, for example, is disposed between a nozzle connection unit and a pump connection unit as a controllable flow path opening and closing mechanism. The reaction container cleaning mechanism 29 moves up and down together with each nozzle with respect to the position of the reaction container 9 that repeatedly moves and stops on the reaction disk 5. Accordingly, each nozzle accesses each reaction container 9. The control apparatus 100 controls a sequence including a series of cleaning steps.

Figure 2B:
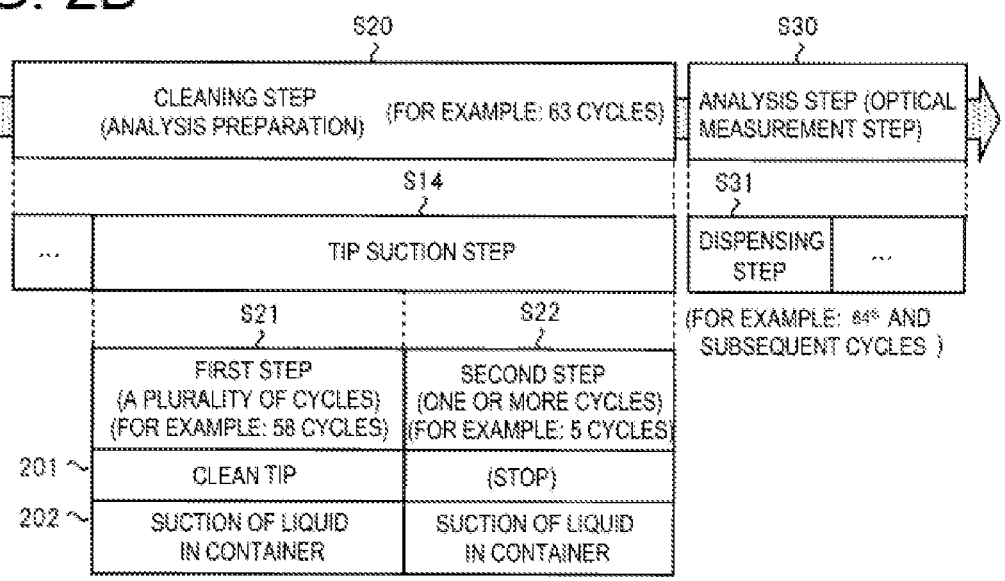

In order to repeatedly use the reaction container 9, in the cleaning steps, the automatic analyzer cleans the reaction container 9 by discharging various liquids such as a detergent and cleaning water into the reaction container 9 and suctioning those liquids from the same with the reaction container cleaning mechanism 29. These cleaning operations are systematized and automated as the sequence of cleaning steps (FIG. 2).

The tip suction step (S14 in FIG. 2) is provided as a final step in the cleaning step before entering an analysis step. In the tip suction step, the remaining liquid in the reaction container 9 is suctioned and removed using the suction nozzle including the suction tip. The reaction container after the tip suction step is used as a reaction container for the analysis in the next cycle or subsequent cycles. As a major premise, the suction tip is not in a contaminated state during the tip suction step. In a case where the suction tip is contaminated, an analysis result may be adversely affected due to the contamination. Therefore, the suction tip must always be ensured in a clean state.

For this reason, the automatic analyzer includes a mechanism and a step that clean the suction tip itself. For example, as a suction tip cleaning method described below (FIG. 6), the tip suction mechanism includes the suction nozzle and the discharge nozzle. The cleaning water is discharged from the discharge nozzle to the suction tip to clean the suction tip. For example, an inside of the reaction container 9 is accessed by the tip suction mechanism and suction of the liquid is performed within a certain period of time in the tip suction step before the start of the analysis. At the same time, the suction tip itself is cleaned by discharging the cleaning water from the discharge nozzle using the tip suction mechanism.

The suction tip cleaning method is based on a precondition that the suction tip itself is wetted with the liquid, thereby avoiding contamination of the suction tip itself. However, when the suction tip is wetted, a droplet may remain adhered to a surface of the suction tip, and the droplet of the suction tip may remain not suctioned. The droplet caused by cleaning the suction tip may, for example, drop into the reaction container to be analyzed and remain therein. In a case where the reaction container in such a state is used for the analysis, the remaining liquid dilutes the reaction solution, and thus the analysis result is affected.

The automatic analyzer according to the first embodiment includes the cleaning function in consideration of the above possibilities. The automatic analyzer controls the specific tip suction step and the tip suction mechanism. Accordingly, the reaction container 9 and the suction tip before the start of the analysis are kept clean, and an adverse effect of the liquid caused by cleaning the suction tip on the analysis result is eliminated.

In the automatic analyzer according to the first embodiment, two types of steps including a first step and a second step are provided in the tip suction step. In a cycle of the first step, both the cleaning of the suction tip and the suction of the liquid in the reaction container 9 are performed. In a cycle of the second step, the cleaning of the suction tip is stopped, and only the suction of the liquid in the reaction container 9 is performed. In a sequence according to the first embodiment, the reaction container in which the suction is performed in a wet state by cleaning the suction tip in the first step is not used in the next analysis step. The second step is interposed between the first step and the analysis step. In the second step, only the suction operation is performed, and the liquid that adheres to the suction tip is removed with a high probability. Accordingly, after the second step, the reaction container used for the analysis is in a state where no liquid remains. In this manner, the suction tip is kept in a clean state, and the unnecessary droplet from the suction tip is prevented from remaining in the reaction container. The number of cycles provided as the second step may be a small number of one or more cycles. Time of the cycle may be, for example, only a few seconds, and can be implemented by shifting analysis start timing as compared with related art. It is not necessary to greatly change hardware of the automatic analyzer.

[Sequence]

FIG. 2 shows the sequence in the automatic analyzer according to the first embodiment. The upper part (A) of FIG. 2 shows an outline of a cleaning step S20 of the reaction container 9 in the sequence, in which the cleaning mechanism is used. The lower part (B) of FIG. 2 shows a relationship between the cleaning step S20 and a next analysis step S30, and details of a tip suction step S14. In the cleaning step S20, cleaning the inside of the reaction container 9 is performed as an analysis preparation before entering the analysis step S30. The cleaning includes rinsing or the like.

The cleaning step S20 includes steps S1 to S14 in order. Steps S1 to S14 are a flow including: (S1) suctioning the reaction solution, (S2) discharging water, (S3) suctioning water, (S4) discharging a detergent A, (S5) suctioning the detergent A, (S6) discharging a detergent B, (S7) suctioning the detergent B, (S8) discharging water, (S9) suctioning water, (S10) discharging water, (S11) suctioning water, (S12) discharging water for a blank test, (S13) suctioning water for the blank test, and (S14) tip suctioning.

In step S1, the reaction solution in the reaction container 9 is suctioned. In step S2, water is discharged into the reaction container 9. The water is system water. The system water is used by introducing purified water such as ion-exchanged water from an outside of the automatic analyzer into an inside of the automatic analyzer through a flow path or the like. In step S3, the water in the reaction container 9 is suctioned.

In step S4, a detergent A (first detergent) is discharged into the reaction container 9. In step S5, the detergent A is suctioned from the inside of the reaction container 9. In step S6, a detergent B (second detergent) is discharged into the reaction container 9. In step S7, the detergent B is suctioned from the inside of the reaction container 9. For example, the detergent A is an alkaline detergent, and the detergent B is an acidic detergent. The detergent and the number of times used are not limited thereto and may be variously modified.

In step S8, the water (system water) is discharged into the reaction container 9 in order to rinse and remove a detergent component. In step S9, the water is suctioned from the inside of the reaction container 9. Steps S10 and S11 are repeated steps similar to steps S8 to S9. Step of rinsing the detergent component is performed a necessary number of times such that the detergent component is sufficiently diluted.

In step S12, the system water is discharged into the reaction container 9 in order to measure a blank value. In step S13, the system water is suctioned from the inside of the reaction container 9. A blank value measurement step is provided between step S12 and step S13 as step S40. In step S40, the blank value is measured using the spectrophotometer 22 of an optical measurement mechanism. The blank value is used at the time of optical measurement calculation in the next analysis step S30, and is an optical measurement value in a state where no reaction solution is in the reaction container 9.

Step S14 provided at an end of the cleaning step S20 is the tip suction step in which suction is performed in order to more reliably remove the liquid from the inside of the reaction container 9 by using the tip suction mechanism including the suction nozzle to which the suction tip is attached. Details of the tip suction step S14 are as follows. The tip suction step S14 includes a first step S21 and a second step S22 in order. The first step S21 includes a predetermined plurality of cycles, for example, all 58 cycles. The second step S22 includes one or more predetermined cycles, for example, five cycles. In each cycle of the first step S21, both cleaning 201 of the suction tip and suction 202 of the liquid (including the remaining liquid and the cleaning liquid) in the reaction container 9 are performed using the tip suction mechanism including a tip cleaning mechanism. In each cycle of the second step S22, the cleaning 201 is not performed, and only the suction 202 is performed.

In the present example, the cleaning step S20 is divided into fourteen steps S1 to S14 as a configuration capable of ensuring predetermined performance sufficient as cleaning performance. The cleaning step S20 is not limited thereto, and can be changed to another configuration in accordance with a functional configuration of the automatic analyzer or an object to be analyzed. The cleaning performance and throughput (time) are basically in a trade-off relationship. In a case where priority is given to increase the cleaning performance, the number of steps or time constituting the cleaning step S20 may be increased. For example, the same type of step may be repeated two or more times.

The tip suction step S14 is followed by the analysis step S30. The reaction container 9 after the second step S22 is used for the analysis. The analysis step S30 has a known configuration, and includes a plurality of steps such as a dispensing step S31. In the dispensing step S31, the sample or the like is dispensed into the reaction container 9 that is in a cleaning-completed state. Although not shown, in an optical measurement step in the analysis step S30, the optical measurement is performed on the reaction solution in the reaction container 9. After receiving a request for starting the optical measurement, the automatic analyzer performs the cleaning step S20 of the above analysis preparation operations before the start of the optical measurement (analysis step S30). Even after the optical measurement step of the reaction solution containing the sample and the reagent (analysis step S30) is started, the reaction containers 9 are sequentially cleaned (normal cleaning step). In the normal cleaning step of the reaction container 9 after the start of the optical measurement, since the suction block is already cleaned before the optical measurement step (the first step S21 in step S14), the automatic analyzer does not clean the suction block and only suctions the liquid in the container.

[Nozzle of Cleaning Mechanism]

FIGS. 3 and 4 illustrate configurations of a plurality of types of nozzles included in the reaction container cleaning mechanism 29 that implements the cleaning step S20. FIG. 3 illustrates a single discharge nozzle and a single suction nozzle. FIG. 4 particularly illustrates a tip suction mechanism 400. FIG. 3 or the like illustrates a state viewed from the horizontal direction (a radial direction of the reaction disk 5) in which the nozzle is inserted into the reaction container 9. At least these nozzles are disposed in the reaction container cleaning mechanism 29, and other types of nozzles may be additionally disposed.

Figure 3A:
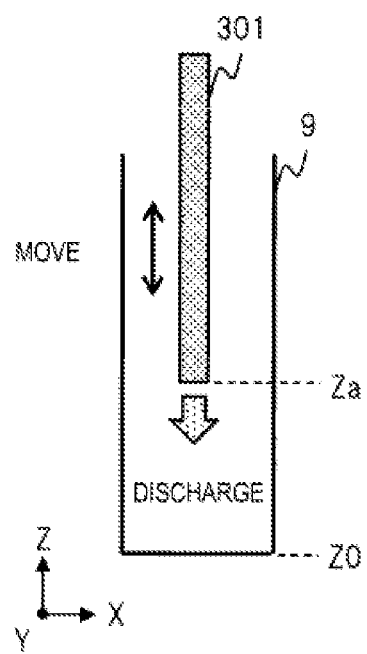
FIGS. 3A and 3B illustrate a configuration of a nozzle of a cleaning mechanism in the automatic analyzer according to the first embodiment.

FIG. 3(A) illustrates a configuration of a discharge nozzle 301. The discharge nozzle 301 is of a type in which a portion to be inserted into the reaction container 9 is configured by a single nozzle, for example, a nozzle used in step S2. The discharge nozzle 301 is controlled in moving up and down in the Z direction. An inside of the discharge nozzle 301 is a flow path that extends in the Z direction in a cavity. An upper end and a lower end in the Z direction of the discharge nozzle 301 are openings. The upper end in the Z direction of the discharge nozzle 301 is connected to a tube (not shown) or the like. An electromagnetic valve, the liquid delivery pump 16 or the like are connected to a head of the tube or the like.

In a step of discharging the liquid into the reaction container 9, a portion including a lower end of the discharge nozzle 301 is inserted into the reaction container 9 by moving downward in the Z direction of the discharge nozzle 301. A distance between a stationary position Za at the lower end of the discharge nozzle 301 and a position Z0 in the Z direction of a bottom surface of an inner wall of the reaction container 9 is set as a height in the Z direction defined in accordance with the step. When the electromagnetic valve is opened, a target liquid is delivered to the discharge nozzle 301 through the tube or the like by a liquid delivery action of the liquid delivery pump 16, and discharged from the lower end of the discharge nozzle 301.

Figure 3B:
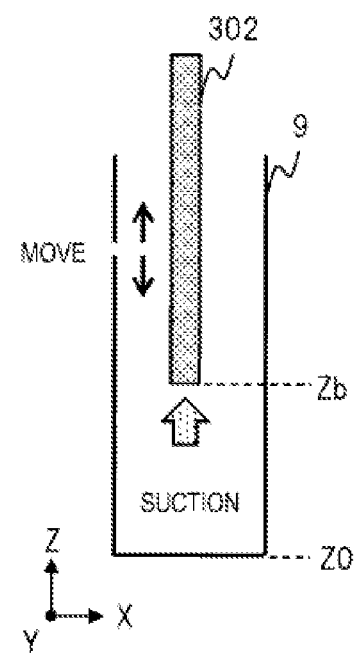

FIG. 3(B) illustrates a configuration of a suction nozzle 302. The suction nozzle 302 belongs to a type in which a portion to be inserted into the reaction container 9 is configured by a single nozzle, for example, a nozzle used in the step S3. The suction nozzle 302 is controlled in moving up and down in the Z direction. An inside of the suction nozzle 302 is a flow path that extends in the Z direction in a cavity. An upper end and a lower end of the suction nozzle 302 in the Z direction are openings. The upper end of the suction nozzle 302 in the Z direction is connected to a tube or the like (not shown). An electromagnetic valve, the vacuum suction pump 17 or the like is connected to a head of the tube or the like.

In a step of suctioning the liquid in the reaction container 9, a portion including the lower end of the suction nozzle 302 is inserted into the reaction container 9 by moving downward in the Z direction of the suction nozzle 302. A stationary position Zb at the lower end of the suction nozzle 302 indicates a position of a height in the Z direction in accordance with the step. When the electromagnetic valve is opened, the liquid is suctioned from the lower end of the suction nozzle 302 by a vacuum suction action. The liquid suctioned from the lower end of the suction nozzle 302 is delivered and discharged through the tube.

Each step has a control condition, and a dedicated nozzle or the like is used. In a plurality of steps, a plurality of types of liquids such as system water, a detergent, system water for cleaning (cleaning water), and system water for measurement of a blank value are treated. A mechanism such as a nozzle in each step corresponds to a liquid to be treated. The automatic analyzer and the cleaning mechanism thereof include a nozzle, a tube, an electromagnetic valve, a flow rate adjustment mechanism, a pump, and a connection part, and all of which can be configured by a known technique. Each nozzle is connected to the pump through a tube or the like. The flow rate adjustment mechanism and the electromagnetic valve are disposed between the nozzle and the pump on a flow path of the tube. The flow rate adjustment mechanism adjusts a flow rate of the liquid delivered at the time of discharge or suction. When the electromagnetic valve is in an open state, the liquid in the flow path is delivered. When the electromagnetic valve is in a closed state, the liquid in the flow path is not delivered. The control apparatus 100 controls the flow rate adjustment mechanism and the electromagnetic valve.

[Nozzle of Tip Suction Mechanism]

FIG. 4 illustrates a configuration of a nozzle of the tip suction mechanism 400 used in the tip suction step S14. The tip suction mechanism 400 includes a discharge nozzle 401 (also referred to as a tip cleaning nozzle), a suction nozzle 402, and a suction tip 403 (also referred to as the suction block). The tip suction mechanism 400 is a mechanism in which both of the tip cleaning mechanism for the cleaning 201 of the tip (suction tip 403) in FIG. 2 and a suction mechanism for the suction 202 of the liquid in the reaction container 9 are implemented in one. In particular, the discharge nozzle 401 and the suction nozzle 402 are connected and fixed, so as to be configured as one discharge and suction nozzle unit. The discharge and suction nozzle unit belongs to a type for use in the tip suction step, and a portion to be inserted into the reaction container 9 is configured by the above two nozzles. A lower end of the suction nozzle 402 in the Z direction is connected and fixed to the suction tip 403. A cross section of the suction tip 403 or the like is described below (FIG. 5).

A connecting structure of the discharge nozzle 401 and the suction nozzle 402 is designed to control a height of discharge from the discharge nozzle 401 to the suction nozzle 402 and the suction tip 403. The discharge and suction nozzle unit has the connecting structure with two types of nozzles in order to clean the suction tip 403 that is at the lower end of the suction nozzle 402 by the cleaning water discharged from the discharge nozzle 401.

The discharge nozzle 401, the suction nozzle 402, and the suction tip 403 are integrally controlled in moving up and down in the Z direction. Insides of the discharge nozzle 401 and the suction nozzle 402 are flow paths that extend in the Z direction in the cavity. Respective upper ends and lower ends of the discharge nozzle 401 and the suction nozzle 402 in the Z direction are openings. The respective upper ends of the discharge nozzle 401 and the suction nozzle 402 in the Z direction are connected to tubes or the like (not shown). An electromagnetic valve, a pump or the like is connected to a head of the tube or the like. The liquid delivery pump 16 is connected to the discharge nozzle 401. The vacuum suction pump 17 is connected to the suction nozzle 402.

In the tip suction step S14, a portion of the tip suction mechanism 400 including the discharge nozzle 401, the suction nozzle 402, and the suction tip 403 is inserted into the reaction container 9 by moving downward in the Z direction. At this time, distances between a position Z0 in the Z direction of the bottom surface of the inner wall of the reaction container 9 and a stationary position Zc at the lower end of the discharge nozzle 401, between the position Z0 and a stationary position Zd at the lower end of the suction nozzle 402 (a boundary with the suction tip 403 in FIG. 4), and between the position Z0 and a stationary position Ze at a lower end of the suction tip 403 are set as heights in the predetermined Z direction in accordance with the tip suction step S14.

In a case of a cycle in which the cleaning 201 of the first step S21 is performed in the tip suction step S14, a target liquid (cleaning liquid) is delivered to the discharge nozzle 401 through the tube or the like by a liquid delivery action of the liquid delivery pump 16 in a state where the electromagnetic valve is opened. Then, the liquid (cleaning liquid) is discharged downward in the Z direction from the lower end of the discharge nozzle 401. The discharged liquid drops on portions low in the Z direction such as an upper surface or a side surface of the suction tip 403. Accordingly, the suction tip 403 itself is cleaned. The liquid dropped on the suction tip 403 flows in the vicinity of the bottom surface of the reaction container 9 through a side surface of the reaction container 9 or the like low in the Z direction. In a case where liquids remain on the side surface or the bottom surface of the inner wall of the reaction container 9 due to an effect of a previous step, these liquids also accumulate in the vicinity of the bottom surface together with the cleaning liquid. For the liquid in the vicinity of the bottom surface, the suction 202 is performed by the suction tip 403 and the suction nozzle 402.

In a cycle in which the suction 202 of the first step S21 and the second step S22 is performed in the tip suction step S14, the liquid in the vicinity of the bottom surface is suctioned from the opening at the lower end of the suction tip 403 by a vacuum suction action of the vacuum suction pump 17 in a state where the electromagnetic valve is opened. Flow paths having relatively narrow width are formed between the side surface of the suction tip 403 and the side surface of the inner wall of the reaction container 9, and between a bottom surface of the suction tip 403 and the bottom surface of the inner wall of the reaction container 9. Therefore, the liquid is efficiently suctioned through the flow path. The liquid suctioned from the opening at the lower end of the suction tip 403 enters the flow path in the suction nozzle 402 through the flow path in the suction tip 403, is delivered from an inside of the suction nozzle 402 through the tube or the like and discharged through the tube or the like.

As described above, in the first step S21 of the tip suction step S14, the suction 202 of the liquid that remains in the reaction container 9 is implemented together with the cleaning 201 of the suction tip 403 itself.

A modification of an automatic analyzer is not limited to the configuration of the tip suction mechanism 400 described above, and may be, for example, the following. The discharge nozzle 401 and the suction nozzle 402 may have an independently separated structure instead of the connecting structure. That is, the tip suction mechanism 400 is configured by a tip cleaning mechanism (discharge mechanism) for cleaning the suction tip 403 and including the discharge nozzle 401, and a suction mechanism including the suction nozzle 402 and the suction tip 403. The discharge mechanism can only move the discharge nozzle 401 up and down. The suction mechanism can only move the suction nozzle 402 with the suction tip 403 up and down. The control apparatus 100 synchronously controls the two mechanisms with respect to the same reaction container 9 during the tip suction step S14, thereby implementing the same operations as described above. As a modification to be described below (FIG. 13), a method for cleaning of the suction tip 403 may not be limited to using the discharge nozzle 401.

[Cross Section of Tip Suction Mechanism]

FIG. 5 illustrates an example of a detailed structure of the tip suction mechanism 400 in FIG. 4. A cross section of the suction tip 403 or the like is illustrated by an XZ plane. FIG. 5 illustrates a stationary state when the suction 202 is performed. The reaction container 9 has, for example, a shape of a parallelepiped long in the Z direction, but may have a cylindrical shape or the like. In a case of the cylindrical shape, the suction tip 403 is also correspondingly formed in a cylindrical shape or the like. With regards to the inner wall (a volume region in which a liquid can be filled) of the reaction container 9, a width in the X direction is set as W0 and a height in the Z direction is set as H0. A width in the Y direction may be the same as or different from the width W0 in the X direction.

Horizontal cross sections of the discharge nozzle 401 and the suction nozzle 402 may be, for example, circular, or rectangular. A diameter of the suction nozzle 402 is set as Wn. A diameter of the discharge nozzle 401 is the same as the Wn, but may be different from the same.

With regards to a shape of the block (parallelepiped) of the suction tip 403, a width in the X direction is set as Wt, and a height in the Z direction is set as Ht. The width Wt of the suction tip 403 is greater than the diameter Wn of the suction nozzle 402 and smaller than the width W0 of the inner wall of the reaction container 9. A predetermined gap K1 is formed between the bottom surface (position Ze) of the suction tip 403 and the bottom surface (position Z0) of the reaction container 9. A predetermined gap K2 is formed between the side surface of the suction tip 403 and the side surface of the reaction container 9. W0≈Wt+K2×2. As with the width Wt in the X direction, a width of the suction tip 403 in the Y direction is defined to match a width of the inner wall of the reaction container 9 in the Y direction.

The suction nozzle 402 and a fixing part 501 are formed of metal, and the suction tip 403 is formed of resin or the like. In the example, a portion as a fixing structure for the suction nozzle 402 and the suction tip 403, which is from the lower end in the Z direction of the suction nozzle 402 to a predetermined length (height Ht), penetrates in the Z direction in the suction tip 403. The suction tip 403 includes a through hole for the penetration. In order to fix the suction nozzle 402 and the suction tip 403, the fixing part 501 is connected to a predetermined position close to the lower end of the suction nozzle 402, and a convex portion (protrusion) on an outer side surface of the suction nozzle 402 is formed. Correspondingly, a concave portion is formed on an inner side surface of the through hole of the suction tip 403. Both the suction nozzle 402 and the suction tip 403 are fixed by covering a periphery of the fixing part 501 of the suction nozzle 402 with the suction tip 403 such that the protruding portion and the concave portion are fitted with each other.

In the example, a tip end of the suction nozzle 402 includes the opening cut at a predetermined angle, but may include a horizontal opening.

The cross-sectional shapes of the suction nozzle 402 and the suction tip 403 are not limited to those described above, and may be variously modified. For example, a structure may be adopted in which the lower end of the suction nozzle 402 is only around the position Zd. In a case where the lower end of the suction nozzle 402 and the arbitrarily shaped flow path in the cavity formed in the suction tip 403 are connected, a same function can be achieved. In addition, a shape of a cavity formed in the suction tip 403 may be a rectangular parallelepiped shape or a cone shape corresponding to an outer shape of the suction tip 403. The upper surface of the suction tip 403 is a horizontal plane, but is not limited thereto, and may be an inclined surface that descends outward from a center axis.

The position Zc at the lower end of the discharge nozzle 401 in the Z direction is defined by a positional relationship illustrated with respect to the suction nozzle 402 and the suction tip 403. That is, the position Zc at the lower end of the discharge nozzle 401 has a distance d1 in a height direction from the position Ze at the lower ends of the suction nozzle 402 and the suction tip 403. The position Zc at the lower end of the discharge nozzle 401 is a distance d2 in the height direction from the position Zd at the upper surface (a boundary with the suction nozzle 402) of the suction tip 403 (d1=Ht+d2).

A horizontal position of a central axis of the discharge nozzle 401 is close to a horizontal position of a center axis of the suction nozzle 402. The liquid (cleaning water) discharged downward in the Z direction from the opening at the lower end (position Zc) of the discharge nozzle 401 mainly drops on the upper surface of the suction tip 403, and also drops on the side surface of the suction tip 403 and the side surface of the reaction container 9. These liquids flow downward in the Z direction from the upper surface of the suction tip 403, and through a flow path between the side surface of the suction tip 403 and the side surface of the reaction container 9. These liquids accumulate in the vicinity of the opening at the lower ends of the suction tip 403 and the suction nozzle 402 through the flow path between a bottom surface of the suction tip 403 and the bottom surface of the reaction container 9. Then, these liquids are suctioned upward in the Z direction from the opening, and are delivered from the upper end of the suction nozzle 402 through the tube or the like. The liquids remaining at the side surface, the bottom surface, and a corner of the reaction container 9 also flow into the liquids that flow at the above time.

[Tip Cleaning Method]

FIG. 6 illustrates a method of the cleaning 201 of the suction tip 403 and operations thereof in the tip suction step S14 according to the first embodiment. In the method, the cleaning liquid is discharged from the discharge nozzle 401 and the suction tip 403 is cleaned based on the configuration of FIG. 4.

In FIG. 6, (1) illustrates a state in which the tip suction mechanism 400 is inserted into the reaction container 9 by descending. It is assumed that droplets of a remaining liquid 601 carried over from the past cycle adhere to reaction container 9. Then, (2) illustrates a state in which the tip suction mechanism 400 is stationary at the predetermined height position as illustrated in FIG. 5 in the reaction container 9. In this state, the cleaning 201 and the suction 202 are performed simultaneously. Cleaning water 602 is discharged from the discharge nozzle 401. The cleaning water 602 and the remaining liquid 601 are suctioned through the suction tip 403 and the suction nozzle 402 as described above. After suction for a predetermined time, almost all the liquids in the reaction container 9 are removed. Then, (3) illustrates a state in which after operations of (2), the tip suction mechanism 400 is pulled out from the inside of the reaction container 9 by ascending. (3) illustrates an ideal state in which the remaining liquid is not present in the reaction container 9 and the droplets do not adhere to the suction tip 403.

Comparative Example and Problems

Additional descriptions are provided with reference to FIG. 7 for the problems. An effect of a tip suction step on an analysis is described. FIG. 7 illustrates an effect of a remaining cleaning liquid from the tip suction step on the analysis in an automatic analyzer of the comparative example. The automatic analyzer of the comparative example includes a tip suction mechanism 700 used in the tip suction step. The tip suction mechanism 700 includes a tip cleaning mechanism having a predetermined method. In the method of the tip cleaning mechanism, the suction tip is wetted with a liquid. The method may be the same as that of the first embodiment (FIG. 6) or may be another method.

In FIG. 7, (1) illustrates a state in which tip cleaning is performed while the tip suction mechanism 700 is inserted into the reaction container 9. The tip suction mechanism 700 includes a suction nozzle 702 and a suction tip 703. In the tip suction step, the liquid in the reaction container 9 is suctioned using the tip suction mechanism 700. In a cleaning step in the comparative example, tip cleaning operations are performed in all cycles immediately before start of the analysis (optical measurement). Accordingly, droplets 701 of a cleaning water may adhere to an upper surface and a side surface of the suction tip 703 without flowing down. Then, (2) illustrates a state in which the droplets 701 that adhere to the surfaces of the suction tip 703 in (1) drop downward in the Z direction. Droplets 706 that drop to a bottom surface of the reaction container 9 are illustrated. Then, (3) illustrates a state in which the analysis is started while the droplets 706 that drop in (2) are on the bottom surface of the reaction container 9. First, in a dispensing step, a dispensing nozzle 704 is inserted into the reaction container 9 to be analyzed, and a sample 705 or the like is discharged. Accordingly, a reaction solution in the reaction container 9 is in a state where the droplets 706 are mixed with the sample 705 or a reagent. A concentration of the reaction solution is diluted by a quantity of the droplets 706. Therefore, measurement accuracy of the optical measurement on the reaction solution may be reduced due to an effect of the droplets 706.

Cleaning of the reaction container 9 in the cleaning step is basically performed in the reaction container 9 used in the analysis. When the analysis is requested and the automatic analyzer operates, the requested reaction container is also cleaned. Such cleaning operations are called analysis preparation cleaning. The reaction container 9 after use in the analysis is always cleaned, but an exception may occur. For example, during performance of a series of sequences, the automatic analyzer may be urgently stopped due to an unexpected accident. In this case, the reaction container 9 in a state where the cleaning is not completed after use may be generated. In a case where the reaction container 9 in that state is used for the analysis after operations of the automatic analyzer are restarted, the proper optical measurement cannot be performed. Therefore, in consideration of such a possibility and a case, the automatic analyzer in the comparative example is controlled such that the cleaning operations on the reaction container 9 are always performed as the analysis preparation cleaning at a predetermined cycle or time at start of the analysis. Accordingly, even when the accident occurs, the analysis in which the cleaned reaction container is used is always implemented. The automatic analyzer according to the first embodiment also has a function of performing the above analysis preparation cleaning, which corresponds to performing the cleaning step S20 before the analysis step S30 in FIG. 2.

The automatic analyzer according to the first embodiment, in a plurality of cycles constituting a series of sequences as shown in FIG. 2, for example, sets 63 cycles (C1 to C63) as cycles of the cleaning step S20 of the analysis preparation, and sets the $64^{th}$ and subsequent cycles (cycles after C64) as cycles of the analysis step S30 at the start of the analysis. The cycles correspond to cycles in which a plurality of reaction containers 9 repeat a rotational movement and a stop at a unit distance on a circumference of the reaction disk 5.

In the automatic analyzer according to the comparative example, a normal cleaning flow is controlled so that the liquid is not discharged from a discharge nozzle to the reaction container 9 in which the liquid is accumulated. This is to prevent overflow of the liquid from the reaction container 9. A same control is also performed in the above analysis preparation cleaning. In the automatic analyzer according to the first embodiment, a mechanism may be disposed including an overflow suction nozzle capable of suctioning the overflow so that the liquid does not overflow from an upper surface (a position Zm in FIG. 4) of the reaction container 9.

As described above, in a case where the droplets 701 due to the cleaning of the suction tip 703 itself remain, there may be the reaction container 9 in a state where the complete cleaning is not finished before the start of the analysis (referred to as a cleaning-not-completed state). That is, the excessive liquid may remain in the reaction container 9 to be analyzed. The automatic analyzers according to the comparative example and the first embodiment do not recognize which reaction container 9 out of the plurality of reaction containers 9 on the disk circumference contains the remaining liquid.

In the automatic analyzer according to the comparative example, suction operations on the solution by the suction nozzle are performed but discharge operations by the discharge nozzle are restricted in a first cycle or up to a second cycle in the analysis preparation cleaning. In a case of the third and subsequent cycles, the suctioned reaction container is rotationally moved to a position where the discharge nozzle is disposed. Therefore, there is no problem discharging to the reaction container. In the automatic analyzer according to the first embodiment, all the discharge nozzles can be in a dischargeable state in the ninth and subsequent cycles.

In a case where a mechanism that observes a state inside all of the reaction containers 9 on the disk is included in the automatic analyzer according to another comparative example, it is possible to recognize which reaction container contains the unnecessary liquid (the reaction container in the cleaning-not-completed state). In this case, the automatic analyzer can select the reaction container in the cleaning-not-completed state and perform the cleaning operations before start of the next analysis, and the liquid is removed from an inside of the container (referred to as a cleaning-completed state). Alternatively, the automatic analyzer can select the reaction container in the cleaning-completed state as an analysis target, and perform the analysis. However, for the automatic analyzer that enables observation of all the reaction containers in this manner, the mechanism and control are complicated, cost is high, and size is large. Therefore, such an automatic analyzer is not practical.

The cleaning operations must be performed in a clean state for parts such as the suction nozzle 402 and the suction tip 403 disposed in the reaction container cleaning mechanism 29. In a case of a sequence configuration in which the analysis is started in the next cycle after the tip suction step, in particular, the suction tip 403 must be kept clean. Therefore, in the automatic analyzers according to the comparative example and the first embodiment, the cleaning 201 of the suction tip 403 itself is incorporated in the cleaning step.

As described above, in a case where the analysis is started after the analysis preparation cleaning, the suction nozzle 402 including the suction tip 403 can be operated from the first cycle in the analysis preparation cleaning, and can access the reaction container 9 in which the liquid remains in any of all the 63 cycles. A surface area of the suction tip 403 is, for example, several times larger than that of each nozzle disposed in the reaction container cleaning mechanism 29. Therefore, in a case where the liquid that adheres to the suction tip 403 flows down into the reaction container 9, degree of contamination caused by the liquid that remains in the reaction container 9 and also an effect on analysis accuracy increase.

In a case of the tip suction mechanism 400 of the tip cleaning method in FIG. 4, the suction tip 403 itself can be cleaned with water by using the discharge nozzle 401 along with the suction 202 of the liquid in the reaction container 9. Therefore, there is an advantage that the reaction container 9 can be prevented from being cleaned by the suction tip 403 contaminated with the excessive liquid. However, there is a problem caused by the method of cleaning the suction tip 403 itself as described above, and is illustrated in FIG. 7.

The tip suction mechanism 400 of the automatic analyzer according to the first embodiment has a structure in which the suction nozzle 402 and the discharge nozzle 401 are connected. In this structure, the cleaning water 602 that cleans the suction tip 403 is discharged to the upper surface or the like of the suction tip 403. In order to increase effect of the suction 202 in which the suction tip 403 is used, it is preferable that gaps between the reaction container 9 and the suction tip 403 (intervals K1, K2) are narrow. However, the droplets 701 containing a minute amount of the cleaning water may remain on the upper surface and the side surface of the suction tip 403. In a case where the droplets 701 that adhere to the surfaces of the suction tip 403 drop to the bottom surface of the reaction container 9, the reaction container 9 in a state where the excessive liquid remains is generated even though the cleaning 201 is performed. In a case where the reaction container 9 is used for the analysis, the reaction solution is diluted by the remaining liquid. Accordingly, deterioration or failure of an optical measurement value may occur.

[Cleaning Function]

With reference to FIGS. 8 to 12, details of the cleaning step S20 and particularly the tip suction step of the cleaning function in the automatic analyzer according to the first embodiment, which correspond to the above problems, are described.

[Simulation]

FIG. 8 shows an experiment and a simulation result of the cleaning step S20 in the automatic analyzer according to the first embodiment. FIG. 8 show the simulation result related to dropping of the droplets 701 of the cleaning water from the suction tip 403 in accordance with a specification of shapes of the reaction container 9 and the suction tip 403. FIG. 8(A) shows the specification of the shapes. As the specification of the shapes, in particular, relationship between a height H (H0 in FIG. 5) in the Z direction of the reaction container 9 and a height h (Ht in FIG. 5) in the Z direction of the suction tip 403 is used as a parameter. For example, as a first range, the height h of the suction tip 403 is set to be less than or equal to a quarter of the height H of the reaction container 9 (h≤(H/4)). As a second range, the height h of the suction tip 403 is set to be greater than a quarter of the height H of the reaction container 9 and smaller than or equal to a half of the height H of the reaction container 9 ((H/4)<h≤(H/2)). As a third range, the height h of the suction tip 403 is set to be greater than a half of the height H of the reaction container 9 and equal to or smaller than the height H of the reaction container 9 ((H/2)<h≤H).

FIG. 8(B) shows a graph of the simulation result. A horizontal axis indicates the number of cycles in which only the suction 202 is performed in the second step S22 in FIG. 2. A vertical axis indicates a probability that the droplets 701 drop into the reaction container 9 from the suction tip 403. A curve 801 shows a case of the first range as a height relationship. A curve 802 shows a case of the second range. A curve 803 shows a case of the third range. In this result, for probability that the droplets drop in the first cycle (C59) of the second step S22, the curve 801 of the first range is highest, followed by the curve 802 of the second range, and lastly by the curve 803 of the third range. That is, when the height h of the suction tip 403 is relatively small, the droplets drop in the earlier cycle.

For example, in the curve 801, the probability is 90% for the first cycle. Most of the droplets can be expected to drop in the first cycle. For example, in a case where the height H of the reaction container 9 is 30 mm and the height h of the suction tip 403 is 8 mm, a ratio thereof is 30/8=3.75, that is, the height h of the suction tip 403 is about a quarter of the height H of the reaction container 9, which is close to the curve 801 of the first range. In this case, the droplets drop with high probability in the first cycle.

The following can be inferred from the result. In a case where the height h of the suction tip 403 is low as in the first range, a Z direction distance or a length of a flow path between the upper surface of the suction tip 403 and the opening at the lower end of the suction tip 403 is short accordingly. Therefore, a force that suctions the droplets 701 which adhere to the upper surface of the suction tip 403 is increased by the suction.

As the number of cycles in the second step S22 is increased, more droplets are expected to drop.

In a case where the droplets drop in the early cycle in the second step S22 in accordance with the specification of the shapes, the number of cycles provided as the second step S22 can be reduced. Accordingly, in a case of a curve in any range, most of the droplets can drop when there are five cycles as the second step S22. Therefore, based on the above result, the number of cycles constituting the second step S22 is set as 5 in the automatic analyzer according to the first embodiment. Accordingly, an effect of the droplets that adhere to the suction tip 403 on the analysis accuracy and risks of measurement failure can be reduced as much as possible. Without being limited thereto, the number of the cycles in the second step S22 may be configured in accordance with the specification of the shape of the suction tip 403 or the like, and a corresponding effect can be achieved when at least one cycle is provided.

According to the detailed structure of the tip suction mechanism 400, there may be a place where the droplets 701 of the cleaning water are easy to adhere to, for example, the vicinity of a junction between the suction nozzle 402 and the suction tip 403. Even in such a case, measures can be taken by providing a sufficient number of cycles in the second step S22.

[Relationship Between Cycle and Container]

FIG. 9 schematically illustrates a state of rotational movement of the reaction container 9 viewed from top of the reaction disk 5 at a certain cycle time regarding a relationship between the cycle and the reaction container 9 which are related to the cleaning function and the tip suction step. Predetermined positions on the circumference of the reaction disk 5 may be, for example, set as positions P1 to P6, and Pa and Pb. For example, the tip suction mechanism 400 for the tip suction step is fixedly disposed at the position P1. For example, the dispensing mechanism for the first dispensing step S31 of the analysis step S30 is fixedly disposed at the position Pa. FIG. 9 illustrates a state where a container A serving as the reaction container 9 is moved to and stopped at the position P1 at a cycle time point. At this time, a container B is disposed at the position P2. Similarly, each reaction container 9 is disposed at a corresponding position, for example, a container C at the position P3, a container D at the position P4, a container E at the position P5.

In the next cycle, the container A at the position P1 moves to the next position Pa, and the container B moves from the position P2 to the position P1 by unit rotational movement. Other containers also perform the rotational movement in the same manner. At the position P1, the tip suction mechanism 400 performs the above operations in an order of the containers A, B, C, D, and E for each cycle of the tip suction step. At the next position Pa of the position P1, dispensing operations in the analysis step S30 are performed.

[Cycle and Container Movement]

FIG. 10, corresponding to FIG. 9, shows the cycle and the movement of the reaction container 9 which are related to a sequence including the tip suction step. In FIG. 10, a vertical direction represents a cycle of a time series, and a horizontal direction represents positions on the disk circumference and the rotational movements of the plurality of reaction containers 9 in FIG. 9. The cycle of the time series shows 58 cycles (C1 to C58) in the first step S21, 5 cycles (#1 to #5) in the second step S22, and a first cycle (C64~) in the next analysis step (S30). In the fifty-eighth cycle of the first step S21, tip suction operations (the cleaning 201 and the suction 202) are performed on, for example, the containers A to Z using the tip suction mechanism 400 at the position P1. For example, the tip suction operations on the container A are performed in a certain cycle Ci. For example, the tip suction operations on the container Z are performed in the last cycle C58 of the first step S21.

Then, in the five cycles of the second step S21, the cleaning 201 is stopped and only operations of the suction 202 are performed by using the tip suction mechanism 400 at the position P1. In the first cycle C59 (#1), the operations are performed on the container A. In the next cycle C60 (#2), the operations are performed on the container B. Similarly, the operations are performed on the container C in the cycle C61 (#3), the container D in the cycle C62 (#4), and the container E in the last cycle C63 (#5). That is, in the five cycles of the second step S21, only the operations of the suction 202 are performed on the containers A to E that pass the position P1.

Then, in the cycle (C64 and subsequent cycles) of the analysis step S30, operations of the dispensing step S31 are performed, for example, using the dispensing mechanism at the position Pa. For example, in the first cycle C64, the dispensing operations are performed on the container E at the position Pa. The container E is in the cleaning-completed state with high probability after the second step S22. Therefore, the container E is used for the analysis. Similarly, the operations such as dispensing are performed on other containers A to D in the subsequent cycles of the analysis step S30.

The first embodiment is configured by a sequence in which the dispensing step S31 at start of the analysis is provided immediately after the second step S22 of the tip suction step. This is because it is preferable to use the reaction container 9 in the cleaning-completed state for the analysis with an interval as little as possible. A modification may be configured by a sequence in which a spare time cycle including one or more cycles or a cycle for another step is placed after the second step S22 and before entering the dispensing step S31.

[State Transition of Container]

FIG. 11 illustrates the state transition of the reaction container 9 in a flow from the tip suction step S14 of the cleaning step S20 to the subsequent analysis step S30. FIG. 11 is illustrated by particularly focusing on the container A, but the same is true for other containers. In the plurality of cycles (C1 to C58) of the first step S21 described above, the operations of the suction 202 of the liquid in the reaction container 9 are performed along with the operations of the cleaning 201 of the suction tip 403. In the plurality of cycles (C59 to C63) in the next second step S22, the cleaning 201 is stopped and only the operations of the suction 202 of the liquid in the reaction container 9 are performed.

In a certain cycle Ci of the first step S21, the cleaning 201 of the suction tip 403 and the suction 202 are performed on the container A at the position P1. In the first cycle #1 (C59) of the second step S22, the suction 202 is performed on the container A at the position P1. At this time, in a case where the droplets drop from the suction tip 403 into the container A, the droplets are removed by the suction 202 with high probability. Accordingly, the container A is in a state where there is no liquid therein, that is, is in the cleaning-completed state. In the second cycle #2 (C60), the suction 202 is similarly performed on other containers at the position P1 and the container A is being moved to another position by the rotational movement. Similarly, the container A moves to respective positions in the third cycle #3 (C61), the fourth cycle #4 (C62), and the fifth cycle #5 (C63).

Then, the analysis step S30 is entered. The first dispensing step S31 is performed on the container A at the predetermined position Pa in a certain cycle Ca. In addition, a known step necessary for the analysis is performed in each cycle. The measurement step is performed at a predetermined position Pk in a certain cycle Ck. That is, a value such as the spectrophotometry is measured based on irradiation of a reaction solution 111 in the container A with a light.

As shown in the above simulation result, in the next cycle immediately after the cleaning 201 of the suction tip 403 in the first step S21, that is, in the first cycle #1 (C59) of the second step S22, the droplets which adhere to the surfaces of the suction tip 403 are likely to drop. In the cycles of the second step S22, the liquid that drops into the reaction container 9 is suctioned and removed by the operations of the suction 202 through the suction nozzle 402 and the suction tip 403. In the reaction container 9 after the cycles of the second step S22, the cleaning-completed state in which no liquid remains in the reaction container 9 is ensured. The reaction container 9 in such a cleaning-completed state is used in the analysis step (the C64 and subsequent cycles).

In the sequence according to the first embodiment, in the cleaning step S21, the suction tip 403 does not access the contaminated reaction container 9 after C58 and subsequent cycles. Therefore, five cycles, which are a difference between C63 and C58, can be provided as the number of cycles in the second step S22. In a sequence configuration according to the first embodiment, time required to start the analysis after receiving an analysis request does not increase with respect to a related sequence configuration. That is, according to the first embodiment, the throughput can be kept almost the same and there is no time disadvantage. According to the first embodiment, an effect of the remaining tip cleaning water on the analysis result is eliminated, and analysis performance can be enhanced even at a clinical examination site for which quick response is required.

[Details of Container States]

FIG. 12 illustrates details of a state of the container A in a certain cycle Ci of the first step S21 and a state of the container A in the first cycle #1 (C59) of the second step S22 in FIG. 11. In the cycle Ci, the cleaning 201 of the suction tip 403 is performed by discharging the cleaning water 602 from the discharge nozzle 401. The suction 202 of the liquid (including the remaining liquid 601 and the cleaning water) in the reaction container 9 is performed by the suction tip 403 and the suction nozzle 402. At this time, the droplets 701 of the cleaning water may adhere to and remain on the surfaces of the suction tip 403.

In the cycle #1 (C59), only the suction 202 is performed. Accordingly, in a case where there are the droplets 701 that are carried over from the previous cycle and adhere to the surfaces of the suction tip 403, the droplets 701 are likely to drop downward in the container. The droplets 706 dropped onto the bottom surface of the reaction container 9 are likely to be removed by the suction 202.

[Effects]

As described above, in the automatic analyzer according to the first embodiment, a cycle in which the cleaning 201 or the like is stopped as in the second step S22 is provided between the first step S21 in which the cleaning 201 in the tip suction step of the cleaning step S20 of the analysis preparation is performed and the analysis step S30. Accordingly, in a case where there are excessive droplets that adhere to the surfaces of the suction tip 403 by the cleaning 201, the droplets can be suctioned and removed through the cycle. A state in the reaction container 9 immediately before the start of the analysis is that the remaining liquid is eliminated, a highly airtight state is achieved, and an adverse effect on the optical measurement is eliminated. Therefore, according to the automatic analyzer of the first embodiment, the cleaning performance of the reaction container 9 can be ensured by a cleaning process including the tip suction step, and decrease in analysis accuracy can be prevented or the analysis accuracy can be improved. In the first embodiment, for all the reaction containers used for the analysis, the cleaning step S20 of the analysis preparation is controlled to pass through the second step S22. Accordingly, deterioration of the optical measurement value due to the remaining liquid of the suction tip 403 can be prevented.

The following is an example of a modification of the automatic analyzer according to the first embodiment. Shapes of the reaction container 9 and the suction tip 403 are not limited to the configuration of the first embodiment, and may be variously modified.

[Modification (1)—Another Tip Cleaning Method]

As a modification, FIG. 13 illustrates another tip cleaning method, and such a method may be applied. Instead of performing the tip cleaning 201 and the suction 202 in cycles of the first step S21 described above, a tip cleaning is performed by a method in FIG. 13. In this method, the discharge nozzle 401 for the tip cleaning 201 is not necessarily included in the tip suction mechanism 400.

In the method, flow operations are schematically described below. First, as illustrated in (1) of FIG. 13, a cleaning liquid 131 is previously stored in the reaction container 9. At this time, the cleaning liquid 131 is discharged into the reaction container 9 using a predetermined discharge nozzle. Then, as illustrated in (2) of FIG. 13, the tip suction mechanism 400 including the suction tip 403 and the suction nozzle 402 gets access to the reaction container 9. That is, the control apparatus 100 moves the suction tip 403 or the like downward in the Z direction, immerses the suction tip 403 or the like in the cleaning liquid 131, and then moves the suction tip 403 or the like upward in the Z direction and raises the suction tip 403 or the like. Then, as illustrated in (3) of FIG. 13, the cleaning liquid 131 in the reaction container 9 is suctioned using the predetermined suction nozzle and the liquid in the reaction container 9 is removed. The procedures of (2) and (3) may be combined into one, and the cleaning water 131 may be suctioned using the suction tip 403 and the suction nozzle 402.

In a case of applying the method, it is necessary to change a part of a configuration of the cleaning step S20 in FIG. 2, but substantially same effects as those of the first embodiment can be achieved.

[Modification (2)—Special Operations of Second Step]

As a modification, FIGS. 14(A) to 14(D) illustrate special operations in cycles of the second step S22. In the modification, the control apparatus 100 controls such that the special operations are performed in the cycles of the second step S22. In particular, in a case where there is a constraint in which only a small number of cycles, such as one cycle or two cycles, can be provided as the second step S22, it is effective to perform such special operations. With the special operations, even when there is only one cycle in the second step S22, droplets of a cleaning water that adhere to surfaces of the suction tip 403 are reliably removed.

FIG. 14(A) illustrates a rapid descent and collision as the first special operation. The control apparatus 100 causes the suction tip 403 of the tip suction mechanism 400 to rapidly descend downward in the Z direction in the reaction container 9. That is, the control apparatus 100 provides acceleration and causes the suction tip 403 to descend at a speed (second speed) higher than that of a normal operation (first speed). Then, the control apparatus 100 causes a lower end of the suction tip 403 to collide with a bottom surface of the reaction container 9. Force at the time of the collision is controlled to a predetermined level. Accordingly, in a case where there are the droplets that adhere to the surfaces of the suction tip 403, the droplets can drop downward with high probability. The suction tip 403 is formed of resin or the like, and the tip suction mechanism 400 or the like also has a shock absorbing function at the time of the collision. Therefore, there is no adverse effect of the collision on a part.

FIG. 14(B) illustrates a rapid ascent as the second special operation. In the same meaning, the control apparatus 100 causes the suction tip 403 or the like to ascend rapidly upward in the Z direction from a state where the suction tip 403 or the like of the tip suction mechanism 400 is in the reaction container 9. That is, the control apparatus 100 provides acceleration and causes the suction tip 403 to ascend at a speed (second speed) higher than that of a normal operation (first speed). Accordingly, the droplets that adhere to the surfaces of the suction tip 403 can drop downward with high probability.

FIG. 14(C) illustrates a micro-vibration as the third special operation. The control apparatus 100 causes the suction tip 403 to vibrate in the horizontal direction from a state where the suction tip 403 or the like of the tip suction mechanism 400 is in the reaction container 9. Accordingly, the droplets that adhere to the surfaces of the suction tip 403 or the like can drop downward with high probability.

FIG. 14(D) illustrates an increase in a suction pressure as the fourth special operation. The control apparatus 100 causes the suction pressure of operations of the suction 202 by the suction tip 403 and the suction nozzle 402 to be higher than usual from a state where the suction tip 403 or the like of the tip suction mechanism 400 is in the reaction container 9 (a state where the lower end of the suction tip 403 is at the predetermined position Ze). That is, a second suction pressure of the suction 202 in the second step S22 is higher than a first suction pressure of the suction 202 in the first step S21. Accordingly, the droplets that adhere to the surfaces of the suction tip 403 can drop downward with high probability and be suctioned.

In control of the special operations of the above (A) to (D), the respective operation may be used alone, or a combination of the operations may be used. Examples of the combination are as follows. The control apparatus 100 causes the suction nozzle 402 or the like to rapidly descend and collide with the reaction container 9 by using the first special operation (A). In this case, the droplets that adhere to the surfaces of the suction tip 403 splash upward due to collision force or the like. In synchronization with timing thereof, the control apparatus 100 causes the suction pressure to increase to the second suction pressure only for a certain short predetermined time. Accordingly, the droplets that splash can be effectively suctioned.

Examples of other special operations include the following. A drying mechanism that removes a liquid in the reaction container 9 and accelerates high airtightness is used. That is, the control apparatus 100 controls to apply a predetermined gas such as air to an inside of the reaction container 9 by using the drying mechanism.

As described above, according to the modification, even if the number of the cycles in the second step S22 is small, by the special operations, drop and removal of the droplets that adhere to the suction tip 403 can be accelerated, an effect on optical measurement can be reduced, and stable operation of the apparatus can be implemented.

The invention has been described in detail based on the embodiment, but is not limited to the above embodiment, and various modifications can be made within a scope not departing from the essence of the invention.

REFERENCE SIGN LIST

S14 tip suction step
S20 cleaning step
S21 first step
S22 second step
S30 analysis step
S31 dispensing step
201 tip cleaning
202 suction of liquid in container

The invention claimed is:

1. An automatic analyzer that has a function of performing optical measurement on a reaction solution which contains a sample and a reagent in a reaction container and cleaning of the reaction container, the automatic analyzer comprising:
a disk mechanism on which a plurality of reaction containers are circumferentially disposed, the disk mechanism configured to control a rotation operation of the reaction containers;
a control apparatus configured to control a sequence which includes the optical measurement and the cleaning;
a block suction mechanism that includes a suction nozzle configured to suction a liquid in the reaction container and a suction block attached to a lower end in a vertical direction of the suction nozzle, the block suction mechanism configured to move the suction nozzle and the suction block up and down in the vertical direction, and suction the liquid; and
a block cleaning mechanism that configured to clean the suction block, wherein
the block cleaning mechanism includes the block suction mechanism, which further includes a discharge nozzle configured to discharge a cleaning liquid to an upper surface of the suction block,
the block suction mechanism and the block cleaning mechanism, during the cleaning of the reaction container, are disposed on predetermined positions on a circumference of the disk mechanism, and
after receiving a start request of the optical measurement, the control apparatus is configured to:
cause, in the step of the cleaning of the reaction container that is provided before a step of the optical measurement and includes a plurality of cycles in which a unit movement of the disc mechanism is set as one cycle, both cleaning of the suction block by the block cleaning mechanism and suction of the liquid by the block suction mechanism to be performed in a first step that includes a plurality of cycles, and only the suction of the liquid by the block suction mechanism to be performed in a second step that includes one or more cycles, and
cause the first optical measurement to be performed by using the reaction container in which the second step is performed.

2. The automatic analyzer according to claim 1, wherein the discharge nozzle is connected to the suction nozzle, and a lower end in the vertical direction of the discharge nozzle is disposed at a position higher than the upper surface of the suction block.

3. The automatic analyzer according to claim 1, wherein a height in the vertical direction of the suction block is equal to or less than a half of a height of an inner wall of the reaction container.

4. The automatic analyzer according to claim 1, wherein the block cleaning mechanism includes a mechanism configured to move the suction block up and down in the vertical direction and immerse the suction block in a cleaning liquid in the reaction container, and
the block cleaning mechanism is configured to move the suction block up and down in the vertical direction and immerse the suction block in the cleaning liquid in the reaction container, so that the control apparatus controls the step of the cleaning in the first step.

5. The automatic analyzer according to claim 1, wherein the control apparatus is configured to cause the suction nozzle and the suction block to descend or ascend in the vertical direction at a second speed faster than a first speed during a normal operation in one or more cycles of the second step.

6. The automatic analyzer according to claim 1, wherein the control apparatus is configured to cause the suction nozzle and the suction block to vibrate to left and right in a horizontal direction in one or more cycles of the second step.

7. The automatic analyzer according to claim 1, wherein the control apparatus is configured to cause a suction pressure of the suction nozzle and the suction block to increase to a second suction pressure higher than a first suction pressure during a normal operation in one or more cycles of the second step.

8. An automatic analysis method in an automatic analyzer, the automatic analyzer having a function of performing optical measurement on a reaction solution which contains a sample and a reagent in a reaction container and cleaning of the reaction container, the automatic analyzer including:
a disk mechanism on which a plurality of reaction containers are circumferentially disposed, the disk mechanism configured to control a rotation operation of the reaction containers;
a control apparatus configured to control a sequence which includes the optical measurement and the cleaning;
a block suction mechanism that includes a suction nozzle configured to suction a liquid in the reaction container and a suction block attached to a lower end in a vertical direction of the suction nozzle, the block suction mechanism configured to move the suction nozzle and the suction block up and down in the vertical direction, and suction the liquid; and
a block cleaning mechanism configured to clean the suction block, the block cleaning mechanism including the block suction mechanism, which further includes a discharge nozzle configured to discharge a cleaning liquid to an upper surface of the suction block,
the block suction mechanism and the block cleaning mechanism, during the cleaning of the reaction container, being disposed on predetermined positions on a circumference of the disk mechanism,
the method comprising:
a step of causing both cleaning of the suction block by the block cleaning mechanism and suction of the liquid by the block suction mechanism to be performed in a first step that includes a plurality of cycles, and a step of causing only the suction of the liquid by the block suction mechanism to be performed in a second step that includes one or more cycles, by the control apparatus after receiving a start request of the optical measurement, the two steps being included in the step of the cleaning of the reaction container that includes a plurality of cycles in which a unit movement of the disc mechanism is set as one cycle, and a step of causing the first optical measurement to be performed by using the reaction container in which the second step is performed.

9. The automatic analyzer according to claim 1, wherein the block suction mechanism is configured to move the suction nozzle and the suction block into a stationary position in the reaction container in which gaps of predetermined lengths between side surfaces of the suction block and the reaction container and between bottom surfaces of the suction block and the reaction container, and to suction the liquid in the reaction container with the suction nozzle and the suction block in the stationary position.

\* \* \* \* \*